United States Patent [19]

Merrell et al.

[11] 4,263,647

[45] Apr. 21, 1981

[54] FAULT MONITOR FOR NUMERICAL CONTROL SYSTEM

[75] Inventors: Gregory L. Merrell, Cleveland Heights; Theodore L. Bernhard, Mentor On The Lake, both of Ohio

[73] Assignee: Allen-Bradley Company, Milwaukee, Wis.

[21] Appl. No.: 9,938

[22] Filed: Feb. 7, 1979

[51] Int. Cl.³ .................. G06F 15/16; G06F 11/30
[52] U.S. Cl. .................................. 364/101; 371/48; 364/119
[58] Field of Search ... 364/101, 102, 119, 200 MS File, 364/900 MS File; 235/304; 371/48

[56] References Cited

U.S. PATENT DOCUMENTS

| | | | |
|---|---|---|---|
| 3,786,433 | 1/1974 | Notley et al. | 364/200 |
| 4,118,771 | 10/1978 | Pomella et al. | 364/101 |
| 4,118,792 | 10/1978 | Struger et al. | 364/900 |
| 4,149,235 | 4/1979 | Floyd et al. | 364/101 |

OTHER PUBLICATIONS

Kompass "New Programmable Controller Has Dual Microprocessors", *Control Engineering,* Oct. 1978, pp. 55–56.

*Primary Examiner*—David H. Malzahn
*Attorney, Agent, or Firm*—Quarles & Brady

[57] ABSTRACT

Associated with each processor in a multiprocessor numerical control system is a watchdog timer circuit which is periodically reset by its processor under normal operating conditions. If a malfunction should occur in one of the processors, its watchdog timer is not reset and it times out. A fault monitor line connects to each watchdog timer circuit and an emergency stop circuit, and when a malfunction occurs in any one of the processors, this condition is indicated to all the processors and to the emergency stop circuit.

7 Claims, 21 Drawing Figures

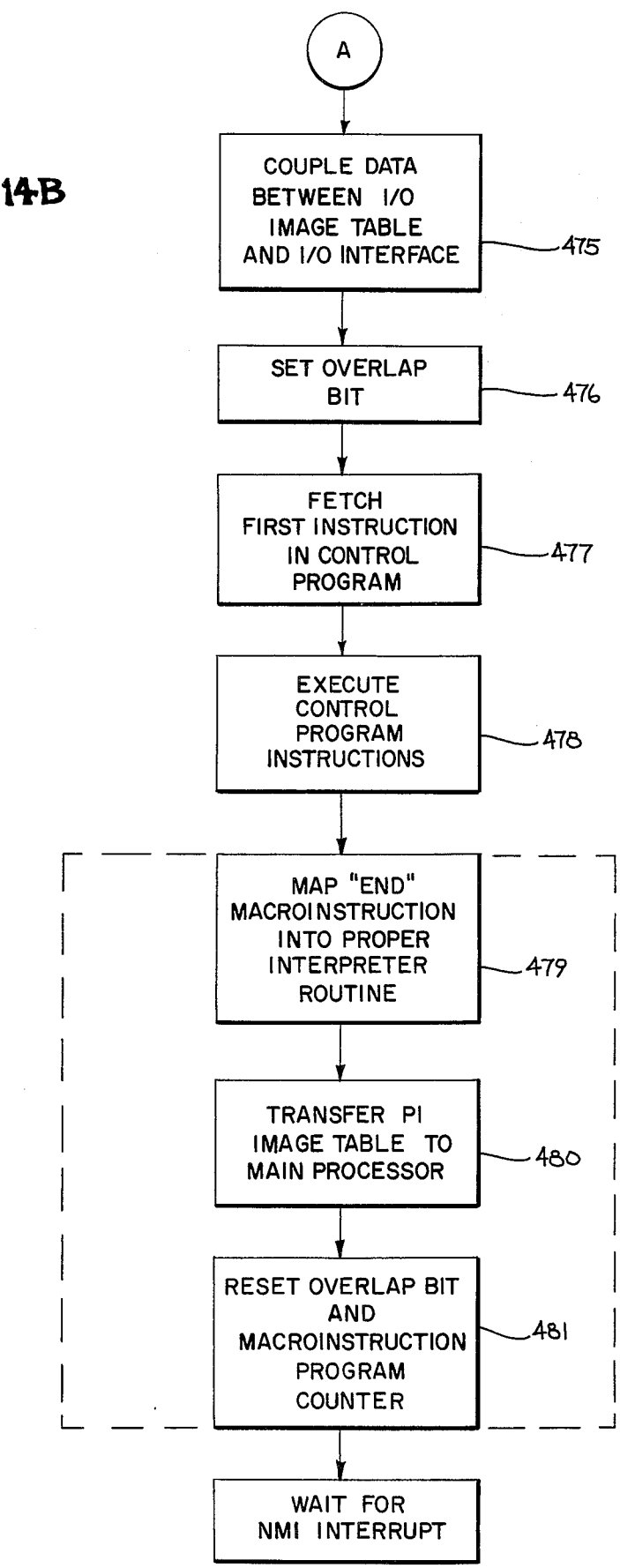

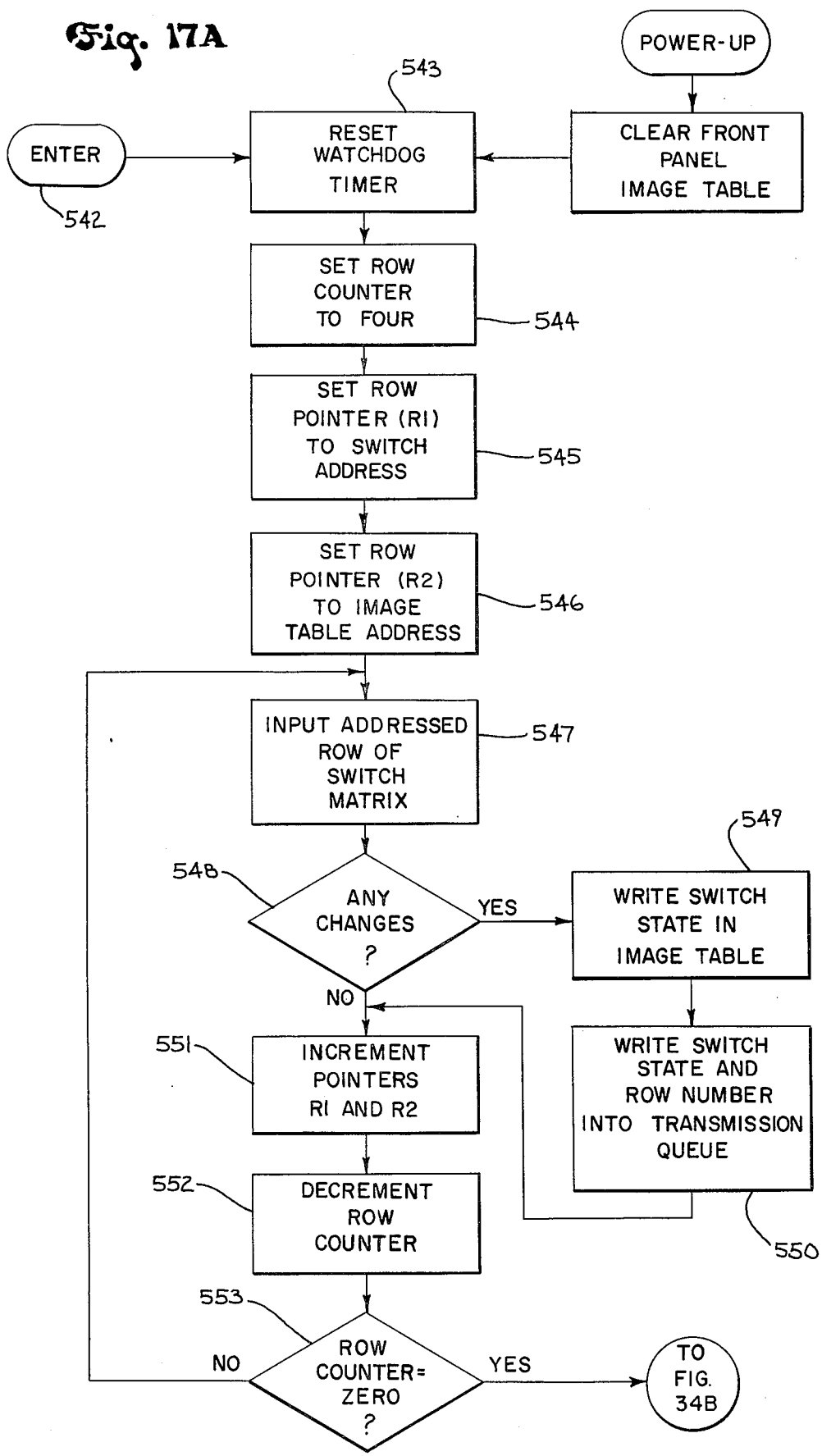

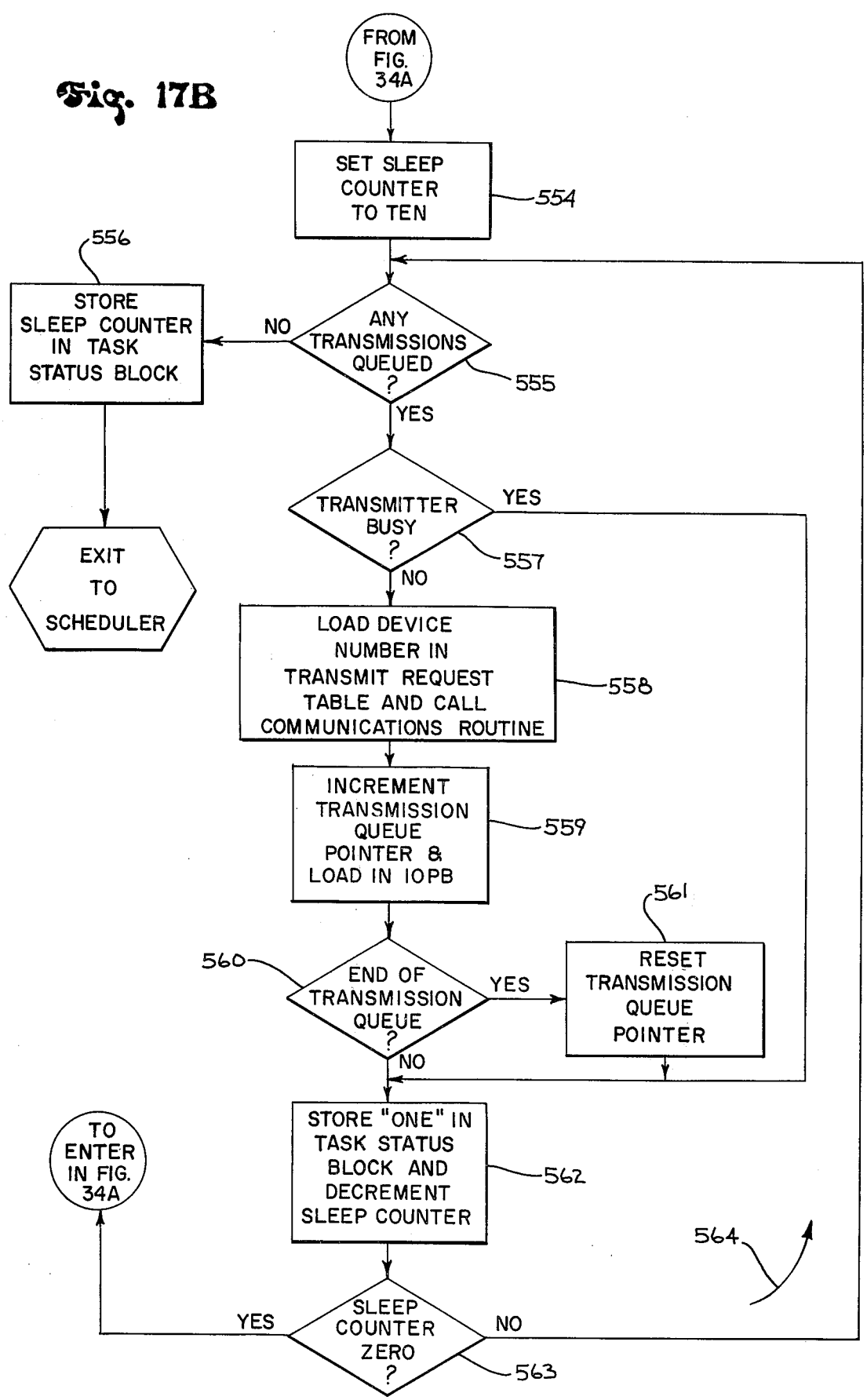

FAULT MONITOR FOR NUMERICAL CONTROL SYSTEM

BACKGROUND OF THE INVENTION

The field of the invention is numerical control systems for machine tools, and particularly, control systems such as that described in copending U.S. patent application Ser. No. 970,959 filed on Dec. 19, 1978 and entitled "Multiprocessor Numerical Control System."

Numerical control systems connect to machine tools to control the motion of a cutting tool and to control the operation of auxiliary functions such as tool changing, pallet changing and coolant control. Traditionally, numerical control systems have been constructed of a large number of discrete logic gates and registers or by programming a minicomputer to perform the various functions. Special industrial control processors such as that disclosed in U.S. Pat. No. 4,038,533 have also been devised and programmed to perform numerical control functions. As indicated by the above cited copending patent application, however, the more recent development is the application of a plurality of programmed microprocessors to perform the various numerical control system functions.

SUMMARY OF THE INVENTION

The present invention relates to a fault monitoring circuit for a numerical control system which includes a plurality of processors each carrying out designated numerical control functions. The fault monitoring circuit includes a set of watchdog timers, one associated with each processor in the numerical control system and each being connected to a fault monitor line. The fault monitor line couples to each of the processors to interrupt their operation when any one or more of the watchdog timers "times out" and it also connects to an emergency stop circuit.

A general object of the invention is to provide a fault monitoring circuit which will sense a malfunction condition in any one of the processors and indicate that condition to all of the numerical control system processors. When a malfunction occurs, the various processors are interrupted and vectored to routines which stop the machine immediately. The emergency stop circuit may include switches which are operated when a malfunction occurs to operate a visual indicator, an audio indicator or any other device which insures that the controlled machine tool is brought to a stop and the operator alerted.

The foregoing and other objects and advantages of the invention will appear from the following description. In the description reference is made to the accompanying drawings which form a part hereof, and in which there is shown by way of illustration a preferred embodiment of the invention. Such description does not necessarily represent the full scope of the invention, and reference is made to the claims herein for interpreting the breadth of the invention.

BRIEF DESCRIPTION OF THE DRAWINGS

FIGS. 14A and 14B is a flow chart of the programmable interface processor operating system;

FIGS. 17A and 17B is a flow chart of the switch monitor routine which forms part of the system of FIG. 15;

DESCRIPTION OF THE PREFERRED EMBODIMENT

Figure 1:
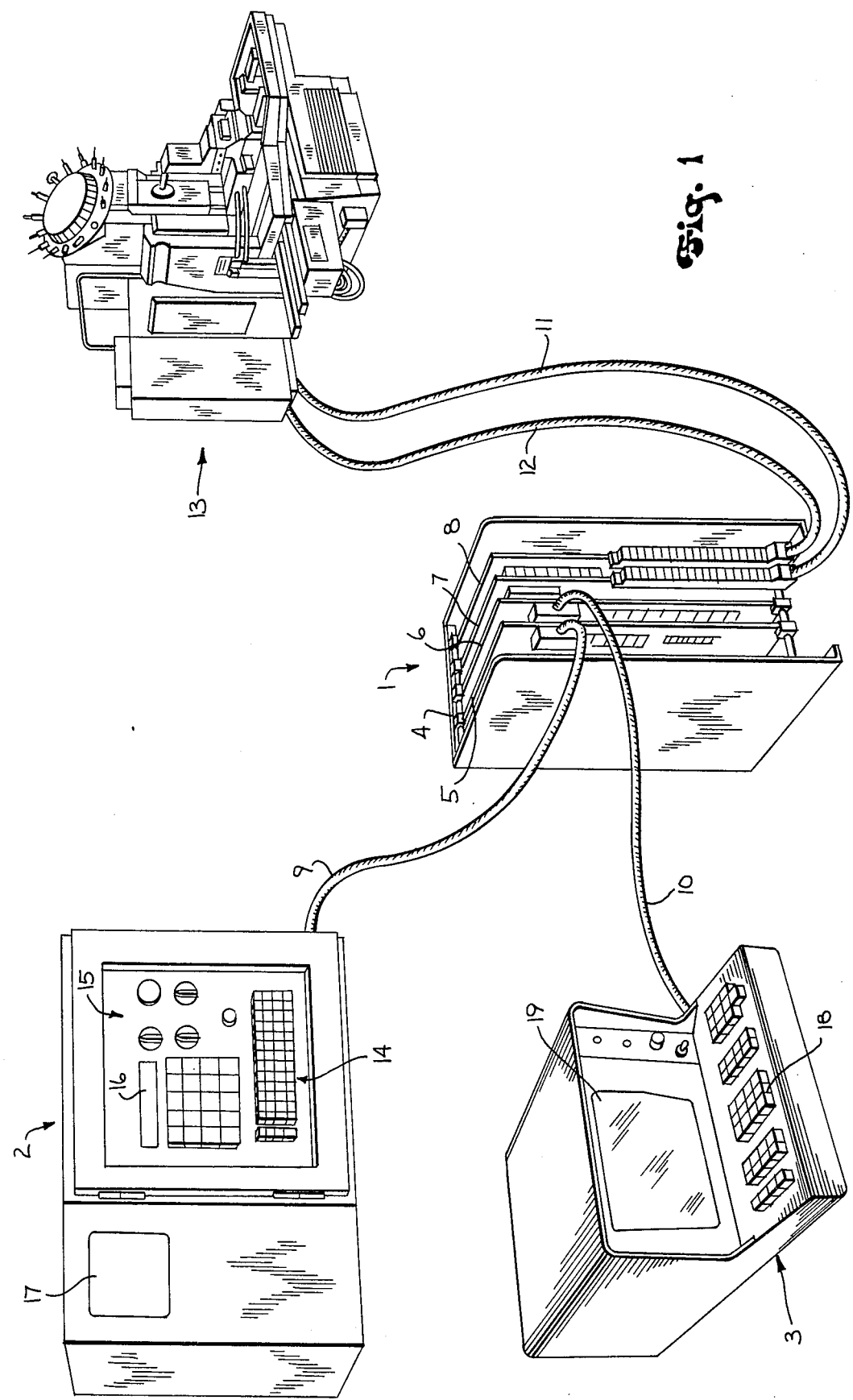
FIG. 1 is a pictorial view of the numerical control system of the present invention.

Referring to FIG. 1, the preferred embodiment of the numerical control system of the present invention is housed within a main enclosure 1 and a pendent control station 2. A program panel station 3 is also employed to load and edit the control program executed by the programmable interface processor, but it does not form part of the operating system. The physical construction of the main enclosure 1 is disclosed in U.S. Pat. No. 4,151,580 issued on Apr. 24, 1979 and entitled "Circuit Board Assembly With Disconnect Arm" and it includes a back plane motherboard 4 and a series of printed circuit boards which connect to the motherboard 4 and extend forward therefrom.

The circuit boards mount much of the circuitry to be described herein, and they include a main processor circuit board 5, a programmable interface circuit board 6, a servomechanism interface board 7 and an I/O interface board 8. The main processor circuit board 5 is connected to the pendent control station 2 through a cable 9 and the programmable interface circuit board 6 is connected to the program panel station 3 through a cable 10. Similarly, the servomechanism interface board 7 and the I/O interface board 8 are connected by cables 11 and 12 to the machine tool 13 which is being controlled. Typically, the main enclosure 1 is housed in a cabinet attached to the machine tool 13 and the cables 11 and 12 contain numerous leads which connect with equipment in the same cabinet. In contrast, the cables 9 and 10 are serial data links which may extend up to 50 feet in length.

The pendent control station 2 is mounted in a location which is convenient to the machine tool operator and it includes a keyboard 14 and switches 15 for manual entry of data. It also includes an optional alpha numeric display 16 and an optional CRT display 17. The pendent control station 2 encloses a front panel processor circuit board (not shown in the drawings) which connects to the cable 9 and which includes circuitry to be described hereinafter that processes data from the keyboard 14 and switches 15 and outputs data to the alpha numeric display 16 and CRT display 17.

The program panel station 3 includes a keyboard 18 and a display 19. The program panel station 3 is connected to the programmable interface circuit board 6 by the cable 10, and it is operated to load and edit a control program of the type executed by programmable controllers. After this operation is completed, the program panel station 3 may be disconnected and used on other machines.

MAIN PROCESSOR HARDWARE

Figure 2:
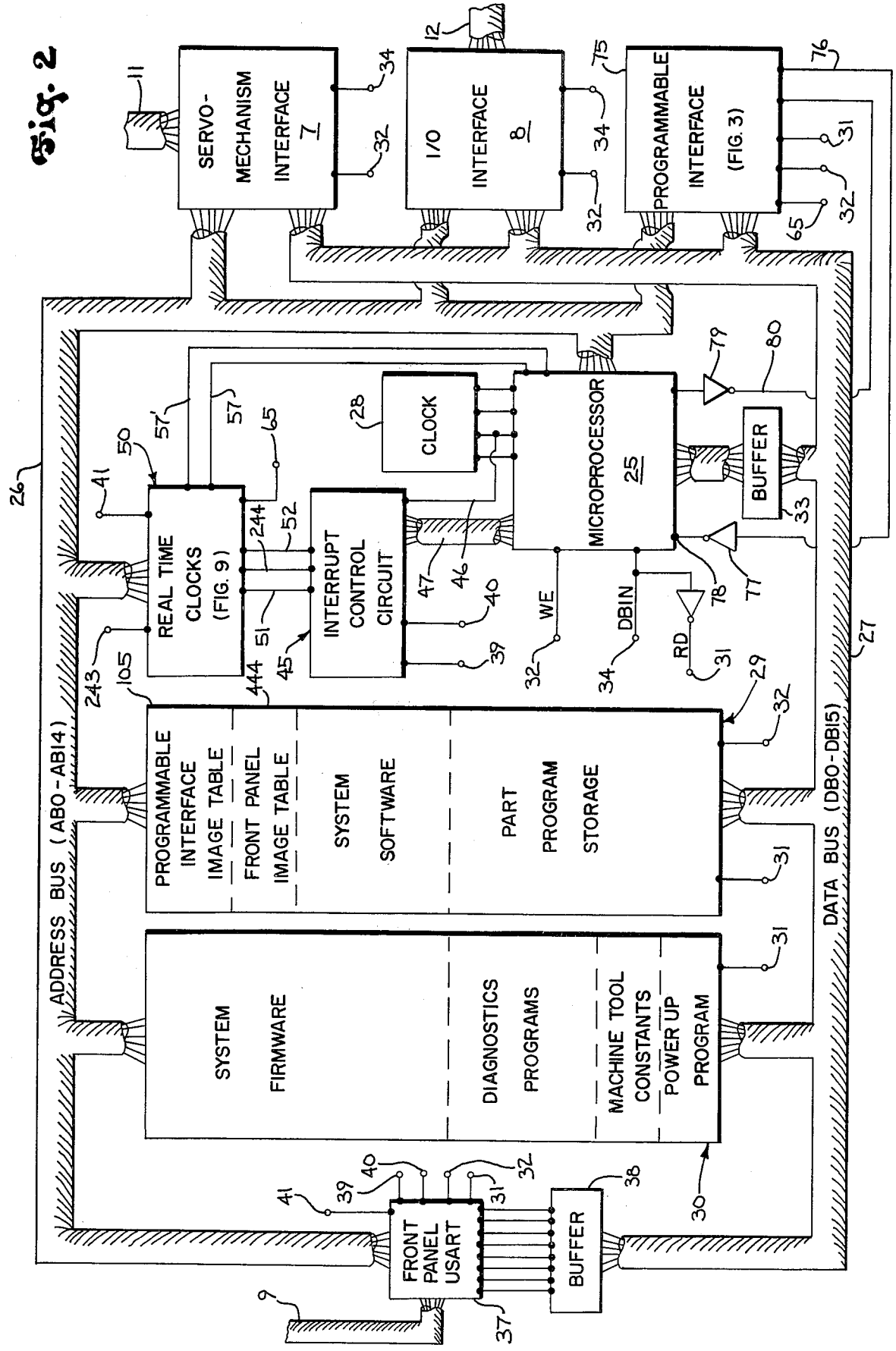
FIG. 2 is an electrical schematic diagram of the main processor portion of the system of FIG. 1.

Referring particularly to FIG. 2, the main processor of the numerical control system is mounted on the circuit board 5 and is formed around a 16-bit microprocessor 25 which is connected to a fifteen-lead address bus 26 and a sixteen-lead data bus 27. A TMS 9900 microprocessor manufactured by Texas Instruments Incorporated is employed and it is driven by a 3.3 megahertz, four-phase clock 28. The address bus 26 and the data bus 27 are also formed in the motherboard 4 and they connect to a number of system elements including a random access memory 29 and a read-only memory 30. Although the size of the memories 29 and 30 can vary considerably depending upon the particular requirements of the system, the basis system includes a 18-bit by 4K random access memory 29 and a 16-bit by 12K read-only memory 30. A RD control line 31 connects both the random access memory 29 and the read-only memory 30 the the microprocessor 25 and a WE control line 32 connects between the random access memory 29 and the microprocessor 25. A 16-bit word is read from either the random access memory 29 or the read-only memory 30 when a selected memory line is addressed through the bus 26 and a logic low control signal is applied to the RD control line 31. The 16-bit word thus read from either the memory 29 or 30 is coupled through the data bus 27 and through a 16-bit buffer 33 to a designated register inside the microprocessor 25. A 16-bit data word is written into the random access memory 29 by addressing a selected line in the memory 29 through the bus 26 and applying a logic low control signal on the WE control line 32. Additional memory may be added to the system, and by expanding the address bus to nineteen leads, up to 512K of memory can be accommodated.

Referring particularly to FIG. 2, the data bus 27 and the address bus 26 also connect through the motherboard 4 to circuits on the servomechanism interface board 7. The servomechanism interface board 7 includes 16-bit motion command registers (not shown in the drawings) and 16-bit feedback word registers (not shown in the drawings). These registers can be separately addressed through the address bus 26 and a 16-bit motion command word can thus be written into any one of the motion command registers when a logic low voltage is applied to the WE control line 32. Similarly, a 16-bit following error word can be read from an addressed feedback register when a logic low voltage is generated on a DBIN control line 34.

As is well known in the art, by periodically calculating a new position command number which is output to the servomechanism on the machine tool 13, the motion of a cutting tool can be precisely controlled. In such case, one position command register and one feedback register is associated with each axis of motion. Although the control loop could be closed within the main processor, in the preferred embodiment the control loop for each axis of machine motion is closed on the servomechanism interface board 7 employing techniques such as that disclosed in U.S. Pat. No. 3,752,969 issued on Aug. 14, 1973 and entitled "Method and Means for Updating the Position Dimension of a Numerically Controlled Machine Tool."

Referring particularly to FIG. 2, the data bus 27 and the address bus 26 also connect through the motherboard 4 to circuits on the I/O interface boards 8. The I/O interface circuit boards 8 include sets of sixteen input circuits and sets of sixteen output circuits. The input circuits are each individually connected to a sensing device on the machine tool 13, such as a limit switch, and each output circuit is connected to an operating device on the machine tool 13, such as a motor starter or solenoid. Input circuits such as those disclosed in U.S. Pat. Nos. 3,643,115 and 3,992,636 may be employed and output circuits such as that disclosed in U.S. Pat. No. 3,745,546 may be employed. Data may be written into a set of output circuits by generating the appropriate address on the bus 26 and applying a logic low voltage to the WE control line 32. Similarly, data can be read from a set of input circuits by generating the proper address on the address bus 26 and applying a logic low voltage to the DBIN control line 34. Although data is written into and read from the I/O interface circuits 8 in sixteen-bit words, it should be apparent that each bit is associated with a discrete sensing or operating device on the machine tool 13. It is these discrete devices which are readily controlled using programmable controller techniques.

Referring particularly to FIGS. 1 and 2, the communication of data to and from pendent control station 2 is provided by a front panel USART 37. The USART 37 includes eight data terminals which connect through a set of eight bidirectional buffers 38 to the eight least significant digit leads DB8-DB15 in the main processor data bus 27. The cable 9 connects to a data receive terminal and a data transmit terminal on the USART 37 and when an eight-bit byte of data is received through the cable 9 from the pendent control station 2, a logic low interrupt is generated on a control line 39. This interrupt is serviced by the microprocessor 25 which generates the address of the front panel USART 37 on the address bus 26 and generates a logic low voltage on the RD control line 31 to read the received byte of data onto the data bus 27. Conversely, when an eight-bit byte of data is to be transmitted to the pendent control station 2, an interrupt is generated by the USART 37 on an interrupt control line 40 to indicate that the previous byte of data has been transmitted. The microprocessor 25 responds by executing an interrupt service routine stored in the read-only memory 30 which addresses the front panel USART 37 through the address bus 26 and generates a logic low voltage on the WE control line 32. An eight-bit byte of data is thus coupled through the buffers 33 onto the data bus 27 and written into the USART 37. The USART 37 then transmits the eight-bit byte of data serially through the cable 9 to the pendent control station 2. The USART 37 is driven by a two megahertz clock that is applied to it through a control line 41.

The USART 37 is a universal receiver/transmitter which interfaces the main processor with the serial data link formed by cable 9. Data is received serially in eight-bit bytes from the cable 9, is checked for transmission errors, and is read out onto data bus 27 as eight parallel bits. As will be described hereinafter, a similar universal receiver/transmitter is connected to the other end of the cable 9 at the pendent control station 2 and data is conveyed back and forth on the cable 9 by them. The cable 9 includes four communication leads and it may extend up to fifty feet in length according to RS-232 protocol.

The interrupts generated by the front panel USART 37 and other elements in the system are received at an interrupt control circuit 45. Referring particularly to FIG. 2, the interrupt control circuit 45 is connected to receive the third-phase clock signal from the four-phase clock 28 through a line 46, and it has a set of four interrupt code outputs and an interrupt request output which connect through a bus 47 to the microprocessor 25. The interrupt control circuit 45 is a commercially available integrated circuit model TMS 9901, and for a complete description of its structure, operation and connection to the microprocessor 25, reference is made to *TMS 9901 Programmable Systems Interface Data Manual* published July, 1977 by Texas Instruments Incorporated. The interrupt control lines 39 and 40 from the front panel USART 37 connect to this interrupt control circuit 45 and the circuit 45 is responsive to a signal on either of these lines to generate a four-bit code along with an interrupt request to the microprocessor 25. The interrupt control circuit 45 also determines the priority of interrupts and a list of the USART 37 interrupts along with other main processor interrupts is provided in Table A in the order of their priority. Some of these interrupts, including those generated by the USART 37, can be disabled, or masked, so that they are not applied to the microprocessor 25.

TABLE A

| Interrupt | Description |
| --- | --- |
| 0 | Restart system. |
| LD | Power on reset. |
| 1 | Standby power has failed. |
| 2 | Single step through program. |
| 3 | Data received by USART 37. |
| 4 | Data transmitted by USART 37. |
| 5 | Time out error on slow memory ready line. |
| 6 | Parity error when reading data bus 27. |
| 7 | Watchdog timer timed out. |
| 8 | 1.6 millisecond clock. |
| 9 | 100 millisecond clock. |

Figure 9:
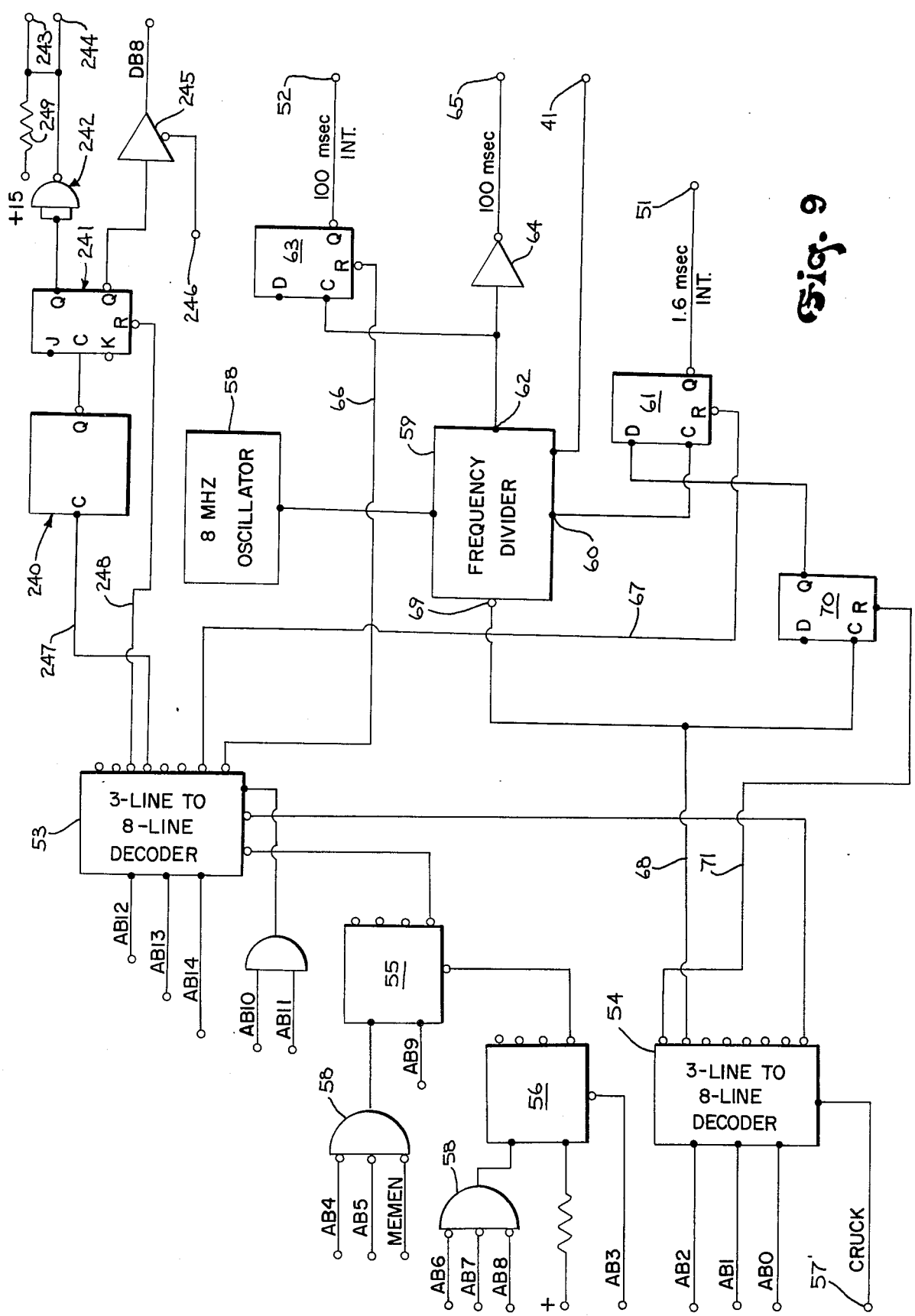
FIG. 9 is an electrical schematic diagram of the real time clock circuit which forms part of the main processor of FIG. 2.

Referring particularly to FIGS. 2 and 9, a real time clock circuit 50 is connected to the address bus 26 and it generates a 1.6 millisecond interrupt through a line 51 and a 100 millisecond interrupt through a line 52 to the interrupt control circuit 45. The real time clock circuit 50 includes a pair of 3-line-to-8-line decoder circuits 53 and 54 and a pair of 2-line-to-4-line decoder circuits 55 and 56. The input terminals as well as one enabling terminal on the decoder circuit 53 are connected to the leads AB10-AB14 in the address bus 26, and the input terminals on the decoder circuit 54 connect to leads AB0-AB2 in the address bus 26. A CRUCLK control line 57' connects an enable terminal on the decoder circuit 54 to the microprocessor 25. A MEMEN control line 57 from the microprocessor 25 connects through a gate 58 to one input of the decoder circuit 5 and the lead AB9 connects to its other input. The decoder circuit 56 is enabled by lead AB3 in the address bus 26 and one of its inputs is driven by a gate 58' which connects to address bus leads AB6-AB8. These decoder circuits are operated when the microprocessor 25 executes the proper instructions to reset the interrupt request hardware now to be described after the request is acted upon.

The real time clock circuit 50 includes an eight megahertz oscillator 58 which drives a multistage binary counter indicated as a frequency divider 59. One output 60 on the frequency divider 59 generates a logic high voltage pulse every 1.6 milliseconds to the clock terminal of a D-type flip-flop 61, and a second output 62 on the frequency divider 59 connects to the clock input on a second D-type flip-flop 63. The second output terminal 62 also connects through an inverter gate 64 to a 100 millisecond clock line 65. A $\overline{Q}$ output on the first D-type flip-flop 61 connects to the 1.6 millisecond interrupt line 51 and a $\overline{Q}$ output terminal on the second D-type flip-flop 63 connects to the 100 millisecond interrupt line 52.

Every 100 milliseconds the second D-type flip-flop 63 is set through its clock terminal and a logic low voltage is generated on the 100 millisecond interrupt line 52 to the interrupt control circuit 45. A reset terminal on the D-type flip-flop 63 is connected through a reset line 66 to the eighth output terminal on the 3-line-to-8-line decoder circuit 53. After the 100 millisecond interrupt is acted upon by the microprocessor 25, an instruction is executed by the microprocessor 25 which generates a logic low reset pulse on the line 66 to reset the second D-type flip-flop 63 and to thereby remove the interrupt request on the line 52.

Similarly, every 1.6 milliseconds the first D-type flip-flop 61 is set through its clock terminal and a logic low voltage is generated on the 1.6 millisecond interrupt request line 51 to the interrupt control circuit 45. After the interrupt is acknowledged, the microprocessor 25 executes an instruction which generates a logic low reset pulse on a line 67 that connects the seventh output of the 3-line-to-8-line decoder 53 to a reset terminal on the D-type flip-flop 61. The D-type flip-flop 61 is thus reset and the logic low interrupt request on the lne 51 is removed.

The operation of the real time clocks are controlled to some extent by program instructions executed by the microprocessor 25. More specifically, when a selected instruction is executed by the microprocessor 25, a logic low voltage is generated on a CLOCK ON line 68 by the second output of the 3-line-to-8-line decoder circuit 54. The CLOCK ON line 68 connects to a reset terminal 69 on the frequency divider 59 as well as a clock terminal on a third D-type flip-flop 70. The Q output on the third D-type flip-flop 70 connects to the D input on the first D-type flip-flop 61. When a logic low voltage is generated on the CLOCK ON line 68, the flip-flop 70 is set to effectively enable 1.6 millisecond interrupts to be applied to the line 51. On the other hand, a CLOCK OFF line 71 connects the first output of the 3-line-to-8-line decoder circuit 54 to a reset terminal on the third D-type flip-flop 70 and when this is driven to a logic low voltage by the execution of another selected instruction, the third D-type flip-flop 70 is reset. The logic low voltage thus generated at its Q output effectively prevents the first D-type flip-flop 61 from being set and it thus prevents the generation of 1.6 millisecond interrupt signals on the line 51.

Connected to the 3-line-to-8-line decoder circuit 53 is a watchdog timer comprised of a monostable multivibrator 240 and a J-K flip-flop 241. The multivibrator 240 is set to generate a logic low pulse to the clock terminal of the J-K flip-flop 241 unless it is reset within 70 milliseconds. A line 247 connects the clock terminal of the multivibrator 240 to the fourth output of the decoder circuit 53, and the multivibrator 240 is reset periodically in response to a selected machine instruction which is executed by the microprocessor 25. If a malfunction should occur in the main processor which prevents this instruction from being executed within 70 milliseconds, the multivibrator 240 times out and sets the J-K flip-flop 241. The Q output on the flip-flop 241 is thus driven to a logic high voltage and this is coupled to an interrupt control line 244 by a NAND gate 242. The interrupt control line 244 connects to the interrupt control circuit 45 and when the watchdog timer "times out," an interrupt request is applied to the microprocessor 25 along with a code which vectors the system to a watchdog timer interrupt service routine.

The $\overline{Q}$ output of the J-K flip-flop 241 is coupled to lead DB8 in the data bus 27 by a tristate gate 245. When the tristate gate 245 is enabled through a control line 246, the state of the watchdog timer can be read into the microprocessor 25 and examined. The watchdog timer is reset through a control line 248 which connects the third output on the decoder circuit 53 to a reset terminal on the J-K flip-flop 241. As will be described in more detail hereinafter, the output of the watchdog timer also connects to a fault monitor line 243. This line 243 is pulled to a logic high voltage through a resistor 249, but is pulled to a logic low voltage by NAND gate 242 when the watchdog timer times out. The fault monitor line 243 connects to the output of watchdog timer circuits in the other system processors and if any of them times out, the line 243 is pulled to a logic low voltage.

PROGRAMMABLE INTERFACE HARDWARE

Figure 3:
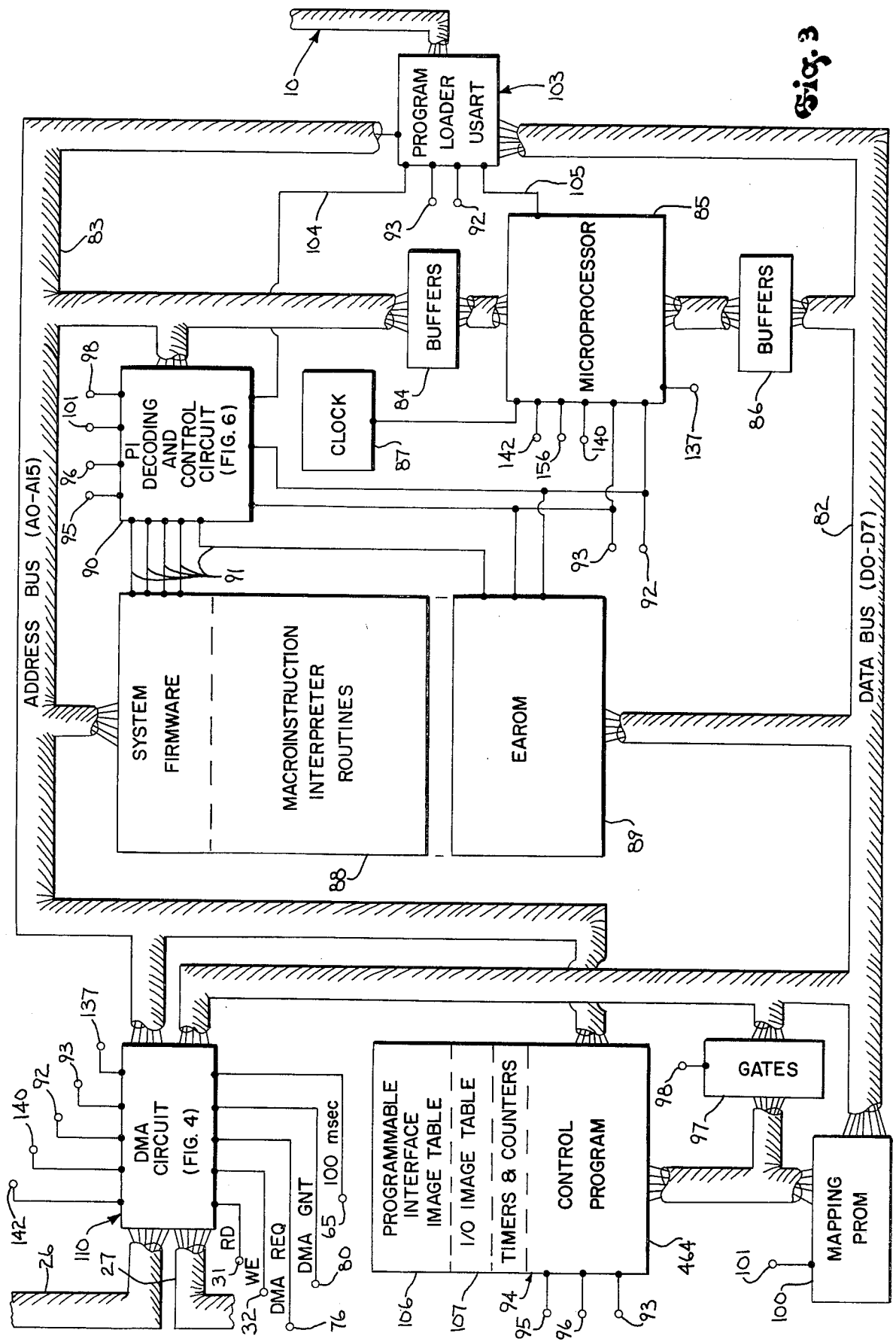
FIG. 3 is an electrical schematic diagram of the programmable interface processor portion of the system of FIG. 1.

Referring to FIGS. 2 and 3, a programmable interface circuit 75 is contained on the programmable interface circuit board 6 and is connected to the main processor data bus 27 and the main processor address bus 26. In addition, the programmable interface circuit 75 connects to the RD control line 31, the WE control line 32 and it receives the 100 millisecond clock from the real time clock circuit 50 through the line 65. The programmable interface circuit 75 is a separate processor and this processor periodically obtains control of the main processor data bus 27 and address bus 26 by generating a logic low signal on a DMA REQ control line 76. This control signal is coupled through an inverter gate 77 to a HOLD terminal 78 on the microprocessor 25. When the request is granted, a signal is generated by the microprocessor 25 through an inverter gate 79 and DMA GNT control line 80 back to the programmable interface circuit 75.

Referring particularly to FIG. 3, the programmable interface circuit 75 is structured around an eight-bit data bus 82 and a sixteen-bit address bus 83. The address bus 83 is driven through a set of sixteen buffers 84 by an eight-bit microprocessor 85. The data bus 82 is coupled to this microprocessor 85 through a set of eight bidirectional buffers 85. A model Z-80 microprocessor manufactured by Zilog, Inc. is employed and it is driven by a four megahertz clock circuit 87.

The programmable interface circuit 75 also includes an eight-bit by 4K line read-only memory 88 and an eight-bit by 2K line electrically alterable read-only memory 89. The memories 88 and 89 connect to the leads (D0-D7) in the data bus 82 and to the leads (A0-A15) in the address bus 83. Selected data can be read from the memories 88 or 89 when the microprocessor 85 executes memory read instructions, and when such an instruction is executed, a logic signal is generated on one of five enable lines 91 and on a "rd" control line 92. A programmable interface decoding and control circuit 90 operates the enable lines 91 and a memory read instruction enables the contents of a selected line in the memory 88 or 89 to be read onto the data bus 82.

Data can also be written into the electrically alterable read-only memory 89 by executing memory write instructions. Such instructions cause the decoding and control circuit 90 to enable the memory 89 through control line 91 and to generate a logic signal on a "wr" control line 93. The data on the data bus 82 is written into the memory 89 when such an instruction is executed.

The programmable interface circuit 75 also includes a nine-bit by 2K line random access memory 94 which connects to the leads (A0-A15) in the address bus 83, which connects to the wr control line 93 and which connects to a pair of enable lines 95 and 96 that are driven by the decoding and control circuit 90. Data is written into an addressed line of the random access memory 94 from the data bus 82 through a set of eight gates 97. The gates 97 each have an enable terminal which is commonly connected through a gate enable line 98 to the decoding and control circuit 90. When a memory write instruction is executed by the microprocessor 85, an eight-bit word is coupled through the gates 97 and stored in the addressed line of the random access memory 94.

Data is read from the random access memory 94 to the data bus 82 through an eight-bit by 512 line mapping prom 100. When data is read from the random access memory 94 the mapping prom 100 is enabled through a "map en" control 101 which is driven by the decoding and control circuit 90. The random access memory 94 stores control program instructions which include operation codes that are not recognized by the microprocessor 85. These operation codes are applied to address terminals on the mapping prom 100 and each unique code addresses a specific line in the mapping prom 100. A number, which indicates the starting address of a control instruction interpreter routine, is stored on the mapping prom line corresponding to each unique operation code. Thus, each time a control instruction operation code is read from the random access memory 94, it is mapped into the number indicating the starting address of its corresponding interpreter routine. These numbers are generated at the mapping prom data terminals which connect to the eight leads in the data bus 82. The programmable interface system jumps to the indicated interpreter routine and the microprocessor 85 executes the machine instructions therein to perform the functions indicated by the control instruction operation code. All other data stored in the random access memory 94 is coupled directly to the data bus 82 without alteration.

The control program is loaded into the random access memory 94 and edited through the program panel station 3. Referring again to FIG. 3, the cable 10 from the program panel station 3 is connected to the serial input and serial output terminals of a program loader USART 103 which has its parallel data terminals connected to the eight leads D0-D7 of the programmable interface data bus 82. A C/$\overline{D}$ terminal on the program loader USART 103 connects to lead A0 in the address bus 83 and its CS terminal connects through a USART EN line 104 to the decoding and control circuit 90. The program loader USART 103 is also connected to the wr and rd control lines 92 and 93 and when an eight-bit byte of data is received by the USART 103 through the cable 10, it generates an interrupt request to the microprocessor 85 through an INT line 105. When the microprocessor 85 acknowledges the interrupt, the system jumps to a program loader routine which is stored in the read-only memory 88. This routine includes instructions which enables the program loader USART 103 through the control line 104 and which generates a logic low signal on the rd control line 92. The received eight-bit byte of data is thus read onto the data bus 82.

Conversely, instructions executed by the microprocessor 85 may also enable the program loader USART 103 through the line 104 and generate a logic low signal on the wr control line 93 to load an eight-bit byte of data into the USART 103. This data is then transmitted serially through the cable 10 to the program panel station 3. In this manner, characters can be input from the keyboard 18 and characters can be output to the display 19 on the program panel station 3.

Figure 4:
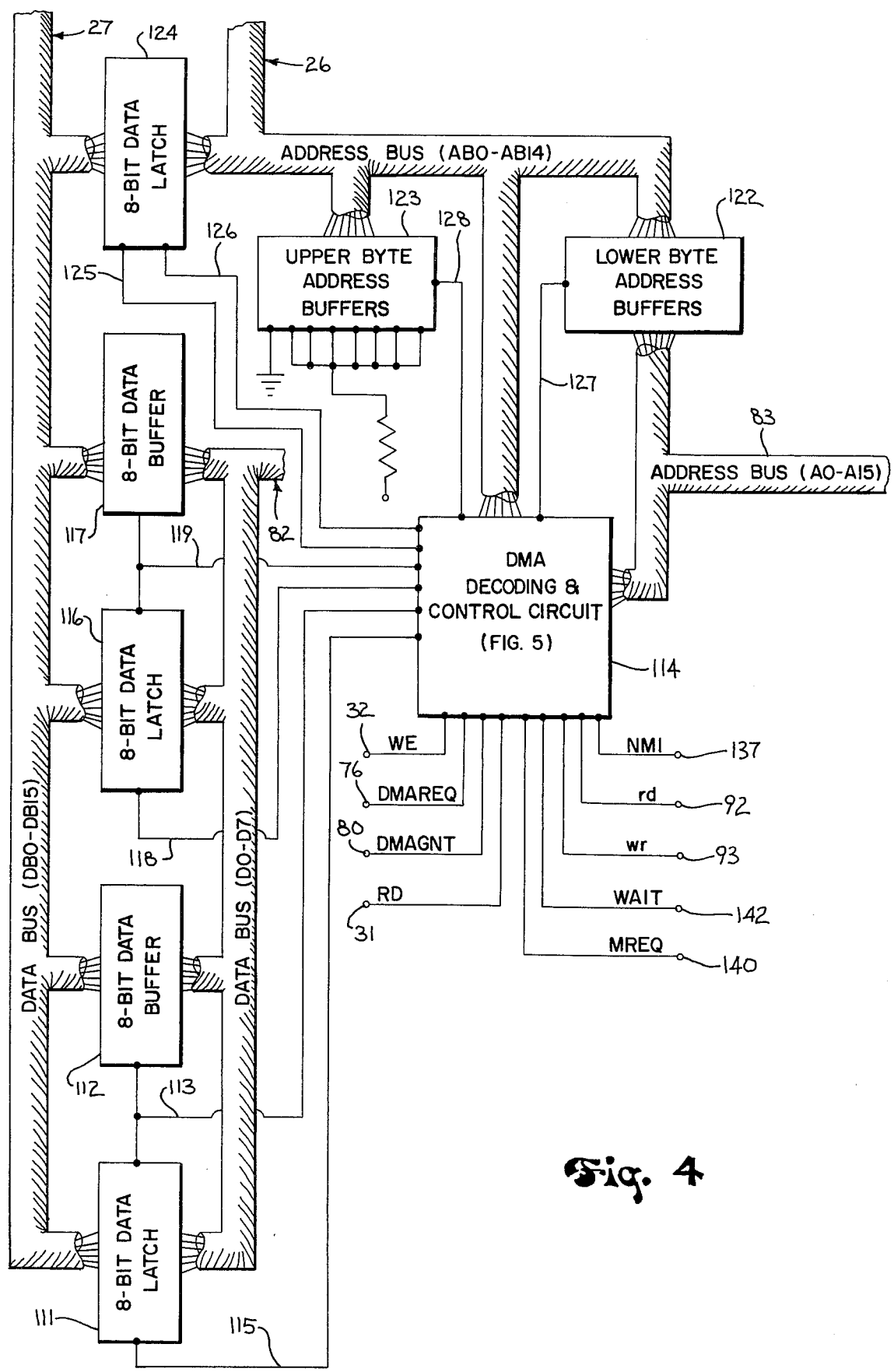
FIG. 4 is an electrical schematic diagram of the DMA circuit which forms part of the processor of FIG. 3.

The programmable interface circuit 75 is interfaced with the main processor by a DMA circuit 110. Referring particularly to FIGS. 3 and 4, data on the sixteen-bit main processor data bus 27 is coupled to the eight-bit programmable interface data bus 82 by an eight-bit data latch 111 and an eight-bit data buffer 112. The lower eight-bit byte of such a sixteen-bit data word is coupled directly through the buffer 112 when a DIN control line 113 is driven low by a DMA decoding and control circuit 114. The upper eight-bit byte is momentarily stored in the latch 111, and during the next machine cycle, a CLIN control line 115 is driven low by the DMA decoding and control circuit 114 to apply the eight-bit byte stored in the latch 111 to the programmable interface data bus 82. The sixteen-bit word from the main processor is thus converted to two eight-bit words in the programmable interface processor.

Data is conveyed in the opposite direction (from the programmable interface processor 75 to the main processor data bus 27) by an eight-bit data latch 116 and an eight-bit data buffer 117. A first eight-bit byte on the programmable interface data bus 82 is stored in the eight-bit data latch 116 when a logic low voltage is applied to a CLOUT control line 118. When a second eight-bit byte of data is then generated on the programmable interface data bus 82, a logic low voltage is generated on a DOUT control line 119. This enables the data latch 116 and the data buffer 117 and both eight-bit bytes of data are simultaneously applied as a sixteen-bit data word to the main processor data bus 27. The bidirectional flow of data from the sixteen-bit main processor to the eight-bit programmable interface processor is thus established.

Referring particularly to FIG. 2, the programmable interface circuit 75 directs the transfer of data to and from the main processor. It transfers data to and from two general locations, a programmable interface image table 105 stored in the random access memory 29, and the I/O interface circuits 8. The programmable interface circuit 75 addresses these locations using the main processor address bus 26 which is relinquished to it when a DMA request is granted.

Referring again to the DMA circuit of FIG. 4, the main processor address bus 26 is controlled by the programmable interface circuit 75 through a set of lower byte address buffers 122 and either a set of upper byte address buffers 123 or an eight-bit data latch 214. Seven inputs to the upper byte address buffers 123 are connected to a source of logic high voltage and its eighth input is connected to signal ground. The eight inputs to the lower byte address buffers 122 are connected to leads A0-A7 in the programmable interface address bus 83. The inputs to the eight-bit data latch 124 are connected to leads in the main processor data bus 27 and during power up, the main processor writes the eight most significant digits of the address of the programmable interface image table 105 into the eight-bit data latch 124. This is accomplished by generating the address EC1E (Hexadecimal) on the address bus 26 during a write instruction. This address is decoded by the DMA decoding and control circuit 114 which enables the eight-bit data latch 124 through an UPP ADD control line 126. Consequently, if the position of the programmable interface image table 105 should be changed for some reason, the programmable interface circuit 75 is automatically appraised of this fact via the eight-bit data latch 124 each time the system is powered up.

A FLREQAK control line 125 also connects to the data latch 124 and it is driven low by the DMA decoding and control circuit 114 to generate the PI image table starting address on the main processor address bus 26. A specific line in the image table 105 is selected by the address on leads A0-A7 in the PI address bus 83 which is applied to the main processor address bus 26 by the lower byte address buffers 122. The address buffers 122 are enabled by a LADREN control line 127.

By sequentially enabling the elements of the DMA circuit 110, the microprocessor 85 may thus read data from the main processor memory 29 and write data into it. In this manner, the contents of the programmable interface image table 105 in the main processor memory 29 and a similar programmable interface image table 106 in the memory 94 are periodically exchanged, or transferred, to reflect changes which have occurred in each since the previous DMA.

Referring again to FIG. 4, the other function of the DMA circuit 110 is to exchange data between the I/O interface circuits 8 and an I/O image table 107 stored in the programmable interface memory 94. This data transfer is controlled by the DMA circuit 110 under the direction of the microprocessor 85 and when such a transfer is to occur, a signal is generated on an IOAK control line 128 which enables the upper byte address buffers 123 in the DMA circuit 110. As a result, the I/O interface circuits 8 are addressed through the bus 26. The particular set of sixteen input or output circuits selected is determined by the eight least significant bits applied to the main processor address bus 26 through the lower byte address buffers 122. The microprocessor 85, under the direction of an I/O scan routine, sequentially addresses each set of input and output circuits through the buffers 122. It operates the DMA circuit 110 to transfer data from the I/O interface circuits 8 to the I/O image table 107 stored in the RAM 94 and it operates to transfer data from the I/O image table 107 to the I/O interface circuits 8. In this manner, the I/O image table 107 is periodically coupled to the discrete sensing devices and operating devices on the controlled machine to both update the I/O image table 107 and to control the operating devices.

Referring particularly to FIG. 4, the control lines which operate the various buffers and data latches in the DMA circuit 110 are driven by the DMA decoding and control circuit 114. This circuit connects to a set of lines leading to the main processor and a set of lines leading to the programmable interface processor, and it is through these lines that it is operated. The decoding and control circuit 114 is shown in detail in FIG. 5 and it includes a 3-line-to-8-line decoder circuit 130 which is driven by control lines 92, 125 and 128 and address bus lead A0. In conjunction with an AND gate 131 and an OR gate 132 this decoder circuit 130 drives the control lines 113, 115, 118 and 119. In addition, the DMA decoding and control circuit 114 includes a set of NAND gates 133, 134 and 135 and an inverter gate 136 which are connected to drive the UPP ADD control line 126 and a NMI control line 137. The NMI control line 137 connects to a corresponding terminal on the programmable interface microprocessor 85. The gates 133–135 are driven by the main processor RD and WE control lines 31 and 32 and by selected leads in the main processor address bus 26. When a logic low voltage is generated on the NMI control line 127, a non-maskable interrupt is indicated to the programmable interface microprocessor 85. It is in this manner that the main processor initiates a sequence of functions which are performed by the programmable interface circuit 75. As will be described hereinafter this occurs every 25.6 milliseconds and it serves to synchronize the operation of the two processors.

After the NMI interrupt has been initiated by the main processor, it continues to carry out its many other functions and the programmable interface processor commences to carry out a number of functions which include the transfer of the contents of the PI image table 105 from the main processor to its own PI image table 106. It performs this transfer by making a series of direct memory access requests from the main microprocessor 25. Referring again to FIG. 5, such a DMA request signal is generated on the DMA REQ control line 76 by a set of gates indicated collectively at 139. These gates are driven by the leads A0, A13 and A15 in the programmable interface address bus 83 and by a "mreq" control line 140 which emanates from the microprocessor 85. In addition to being applied to the main microprocessor 25, this DMA request signal is also coupled through a NAND gate 141 back to the microprocessor 85 through a wait control line 142. The microprocessor 85 is thus held, or frozen, until the main microprocessor 25 responds to the DMA request.

This response is received through the DMA GNT control line 80 and is coupled through an OR gate 143 to a pair of AND gates 144 and 145 and an exclusive NOR gate 146. The AND gates 144 and 145 are also driven by a second pair of AND gates 147 and 148, which are in turn driven by the set of DMA request gates 149 and the lead A14 in the programmable interface address bus 83. The state of the lead A14 in the programmable interface address bus 83 determines whether the DMA request is for the purpose of exchanging data in the programmable interface image tables or for exchanging data between the I/O image table 107 in the random access memory 94 and the I/O interface circuits 8. If the purpose of the DMA request is to exchange data between the programmable interface image tables, the AND gate 145 is enabled and the FLREQAK control line 125 is driven high. On the other hand, the AND gate 144 is enabled and the IOAK control line 128 is driven high when data is to be exchanged with the I/O interface circuits 8. In either case, the LADREN control line 127 is driven high by an OR gate 149 and the wait line 142 is released through a time delay circuit which includes gates 150 and 151. The programmable interface microprocessor 85 then controls not only its own buses and control lines, but also the main processor address bus 26, main processor data bus 27, the RD control line 31 and the WE control line 32.

Figure 6:
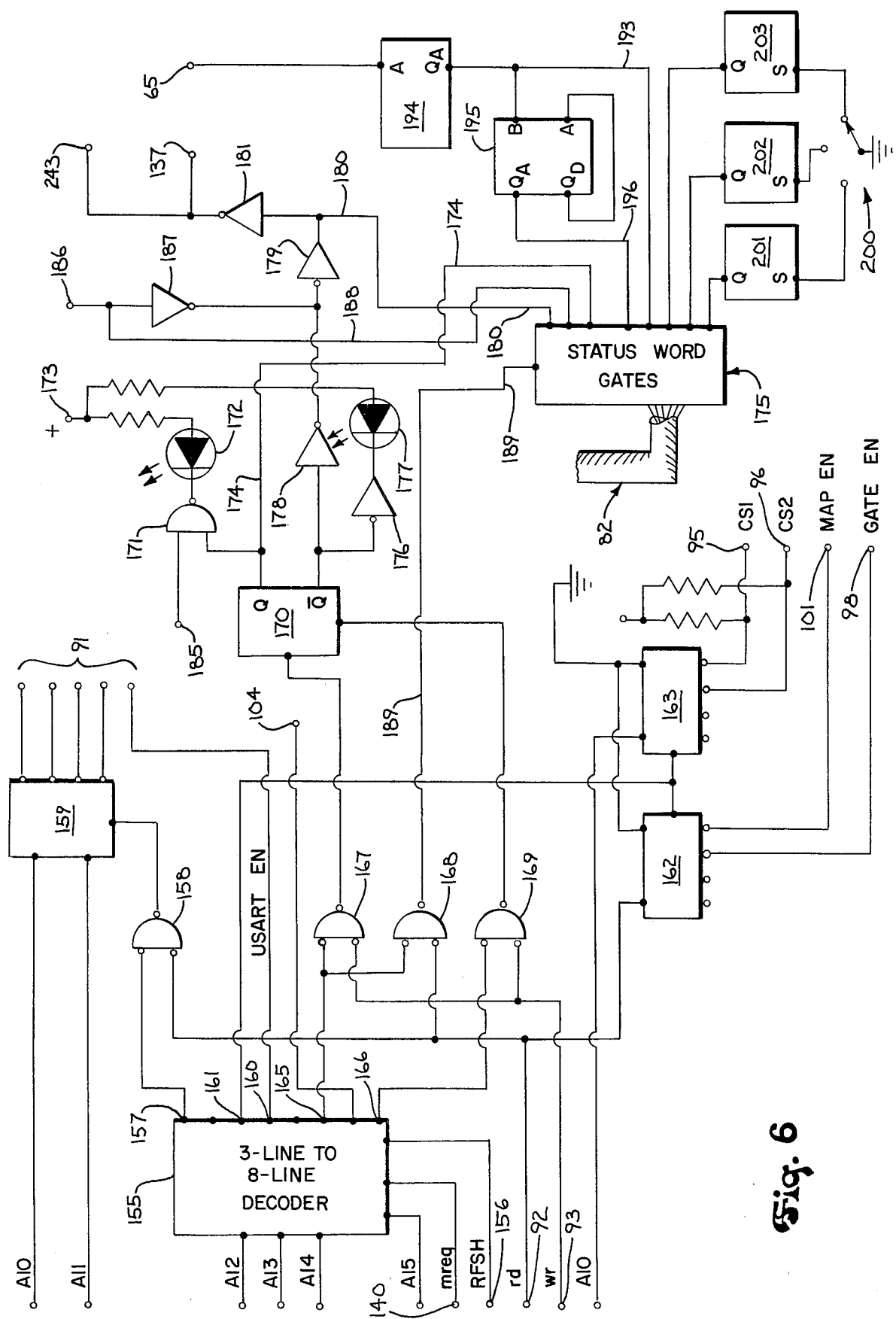
FIG. 6 is an electrical schematic diagram of the decoding and control circuit which forms part of the processor of FIG. 3.

Referring to FIGS. 3 and 6, the programmable interface decoding and control circuit 90 generates enabling signals to the various elements of the programmable interface circuit 75, including the DMA circuit 110. The decoding and control circuit 90 includes a 3-line-to-8-line decoder circuit 155 which connects to leads A12, A13, A14 and A15 in the address bus 83. It also connects to the control line mreq 140 and a control line RFSH 56 which are both driven by the microprocessor 85. The first output terminal 157 on the 3-line-to-8-line decoder 155 along with the rd control line 92 connect to the inputs of a NAND gate 158 which drives the enabling terminal on a 2-line-to-4-line decoder circuit 159. The decoder circuit 159 is driven by the leads A10 and A11 in the address bus 83 and its four outputs along with the fourth output 160 on the decoder circuit 155 form the control lines 191 which enable the read-only memory 88 and the electrically alterable read-only memory 89. A third output terminal 161 on the 3-line-to-8-line decoder circuit 155 connects to the enabling input on both a second 2-line-to-4-line decoder circuit 162 and a third 2-line-to-4-line decoder circuit 163. One input on each decoder circuit 162 and 163 is connected to signal ground, a second input on the decoder circuit 162 is connected to the rd control line 92, and a second input on the decoder circuit 163 is connected to the lead A10 in the address bus 83. The first output of the decoder circuit 162 drives the map en control line 98. Similarly, the first and second outputs on the third decoder circuit 163 drive the CS1 control line 95 and the CS2 control line 96.

The sicth and eighth output terminals 165 and 166 on the 3-line-to-8-line decoder circuit 155 operate a watchdog timer circuit. More particularly, the output terminal 165 connects to inputs on a pair of NAND gates 167 and 168 and the output terminal 166 connects to one input of a NAND gate 169. The second inputs on the NAND gates 167 and 169 are connected to the wr control line 93 and a second input on the NAND gate 168 is connected to the rd control line 92. The output of NAND gate 167 connects to the input of a seventy millisecond monostable multivibrator 170 and the output of the NAND gate 169 connects to the reset terminal on this multivibrator 170. A Q output on the multivibrator 170 connects through a NAND gate 171 and a first light emitting diode 172 to a positive d.c. supply terminal 173 and it connects through a line 174 to one input on a set of status word gates 175. The $\overline{Q}$ output on the monostable multivibrator 170 connects through a gate 176 and second light emitting diode 177 to the positive d.c. supply terminal 173, and it connects through a pair of gates 178 and 179 to another input on the status word gates 175 through a line 180. The line 180 also connects through an inverter gate 181 to the NMI control line 137 and to the fault monitor line 243.

Under normal operating conditions a machine instruction is periodically (i.e., less than 70 msec.) executed by the programmable interface microprocessor 85 which causes a logic low voltage to be generated at the output of the NAND gate 167. This logic low voltage retriggers the monostable multivibrator 170 so that its $\overline{Q}$ output remains at a logic low voltage and its Q output remains at a logic high voltage. If it is not retriggered within seventy milliseconds, however, the Q output of the monostable multivibrator goes low and its $\overline{Q}$ output goes high. As a result, the second light emitting diode 177 is illuminated to visually indicate that the watchdog timer has timed out and a logic high voltage is generated on the line 180 to initiate a logic low non-maskable interrupt through the NMI control line 137 and to pull the fault monitor line 124 low. The line 180 also drives the first input on the status word gates 175 so that a logic high voltage is indicated in the status word when the watchdog timer times out.

Referring still to FIGS. 3 and 6, a parity generator (not shown in the drawings) associated with the random access memory 94 in the programmable interface circuit 75 connects through one lead 185 to the NAND gate 171 and through a second lead 186 to an inverter gate 187. When a parity error is sensed, the output of the NAND gate 171 goes low to energize the first light emitting diode 172, and a non-maskable interrupt is initiated through the NMI control line 137 by the gates 187, 179 and 181. In addition, the line 186 connects through a line 188 to an input on the status word gates 175 with the result that the parity error is also indicated in the status word.

When either a parity error occurs or when the watchdog timer times out, one of the light emitting diodes 172 or 177 is energized and a non-maskable interrupt is requested from the microprocessor 85. In response, the programmable interface system jumps to a program which among other functions enables the status word gates 175 through an enable line 189. The enable line 189 is driven by the NAND gate 168. The logic state of the eight input terminals on the status word gates 175, including the logic state of the lines 174 and 188, are thus read onto the programmable interface data bus 82. The cause of the interrupt is then determined by subsequent machine instructions which examine the bits of this status word.

Referring particularly to FIG. 6, the status word read from the status word gates 175 also contain other information. Particularly, one of its inputs is connected through a line 193 to the $Q_a$ output of a first four-bit binary counter 194. The A input on the counter 194 is driven by the 100 millisecond real time clock signal on the B input on a second four-bit decade counter 195. The $Q_a$ output on this counter 195 is connected through a line 196 to another input on the status word gates 175.

The signal on the line 93 is a 200 millisecond real time clock signal and the signal on the line 196 is a two-second real time clock signal. These real time clock signals are required by the programmable interface system to execute timer instructions that are employed in the control program.

The status word gates 175 also provide an indication of the mode in which the programmable interface circuit is to operate. More particularly, a single pole three position mode switch 200 is mounted along the back edge of the programmable interface circuit board 6 and its three poles are connected to the set terminals of three respective flip-flops 201, 202 and 203. The Q output terminals on the respective flip-flops 201-203 are connected to separate inputs on the status word gates 175 and the position of the mode switch (i.e., load, test, or run) is thus determined by the logic state of these outputs which form part of the status word.

The various elements of the programmable interface circuit 75 are enabled and operated in response to specific machine instructions executed by the microprocessor 85. The operation codes in such instructions operate the wr control line 93, the rd control line 92 and the mreq control line 140, and the operand, or address, codes in such instructions select a system element. The memories 88, 89 and 94 are, of course, enabled by a range of addresses, but each line in these memories has its own distinct address. For a list of the operation codes which will provide the required control line states, reference is made to the *Z80-CPU Technical Manual* published in 1976 by Zilog.

PENDENT CONTROL STATION HARDWARE

Referring particularly to FIGS. 1, 2 and 4, the pendent control station 2 is connected to the main processor circuit board 5 by the cable 9. The cable 9 connects to a USART 220 at the pendent control station 2. The USART 220 is mounted on a circuit board (not shown in the drawings) with other elements of a front panel processor. These elements include a sixteen-bit microprocessor 221 which is a model TMS 9900 manufactured by Texas Instruments, Inc. The microprocessor 221 is connected to drive a fifteen-lead address bus 222 and it is connected to a sixteen-lead bidirectional data bus 223.

Machine instructions for the microprocessor 221 are stored in a sixteen-bit by 16 K line programmable read-only memory 224. Also connected to the address bus 222 and the data bus 223 is a sixteen-bit by 4 K line random access memory 226 and a four-bit by 2 K line electrically alterable read-only memory 225 which stores display messages. Data may be read from any of the three memories 224-226 when they are enabled through respective PROM EN, EAROM EN and CS control lines 227-229 and when the proper logic state is generated on respective AD and WE control lines 230 and 231. Data can also be written into the random access memory 226 when it is enabled through the cs control line 229 and when the we control line 231 is at a logic high voltage state. Data can also be written into the electrically alterable read-only memory 225 when it is enabled through the EAROM EN control line 228 and a logic low voltage appears on the we control line 231. The particular line into which data is written or from which data is read in any of the memories 224-226 is selected by the address on the address bus 222.

Figure 7:
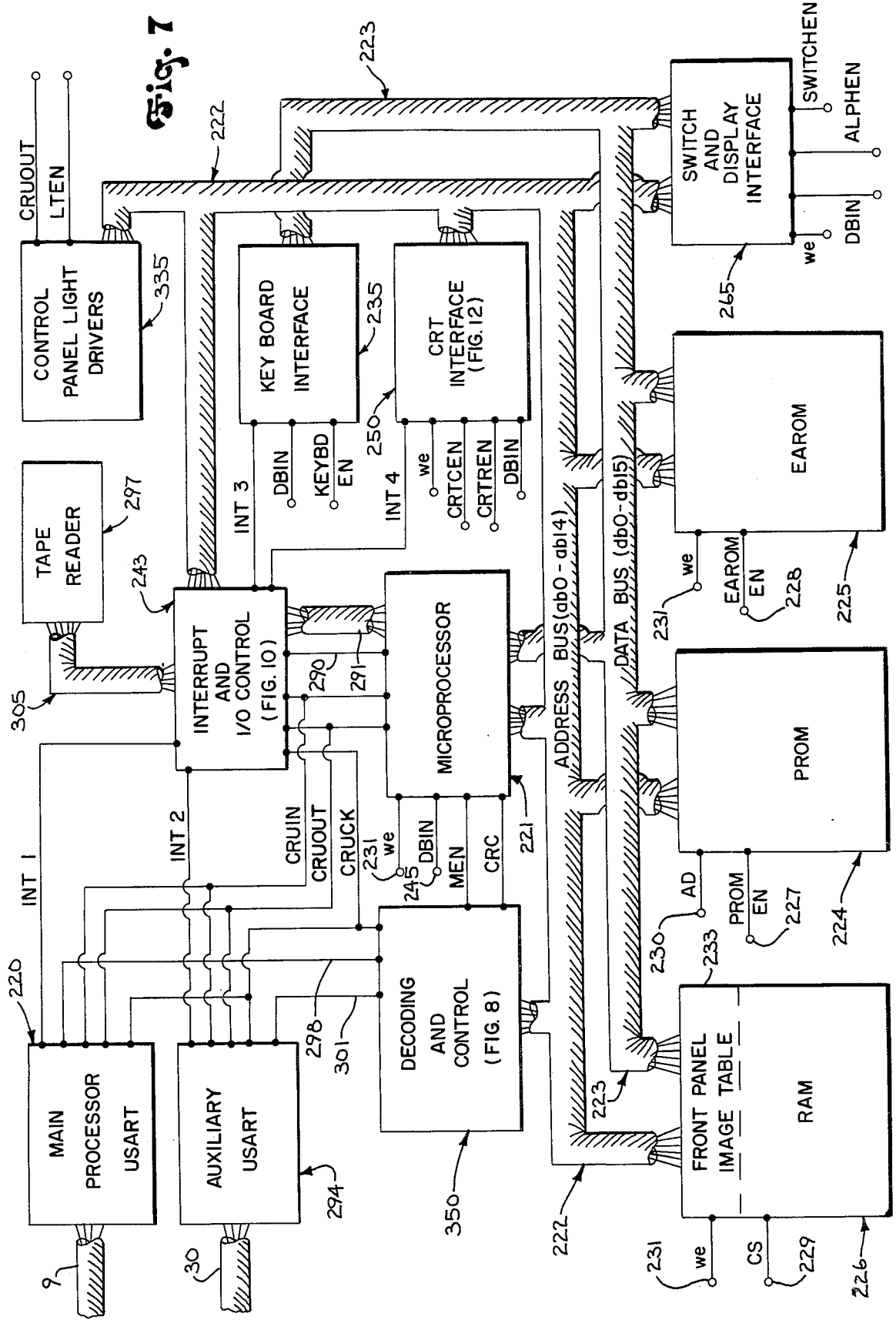
FIG. 7 is an electrical schematic diagram of the front panel processor portion of the system of FIG. 1.

Referring particularly to FIG. 7, the keyboard 14 on the pendent control station 2 is coupled to the front panel processor data bus 223 by a keyboard interface circuit 235. Similarly, the CRT display 17 is coupled to the data bus 223 by a CRT interface circuit 250 and the switches 15 and the alpha-numeric display 16 are coupled to the data bus 223 by an interface circuit 265. A detailed description of the structure and operation of these circuits are contained in the copending application "Multiprocessor Numerical Control System" referred to above.

Figure 10:
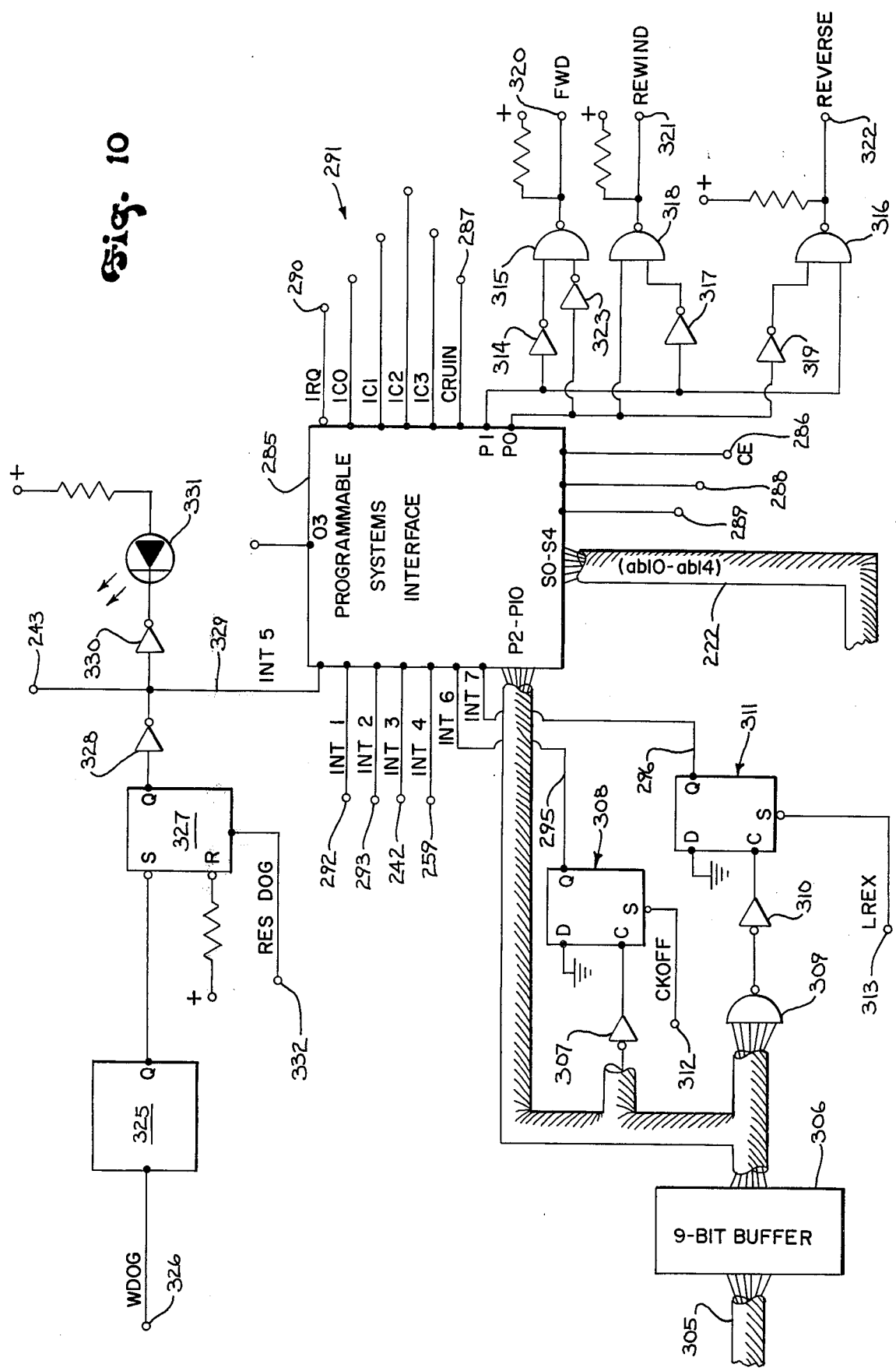
FIG. 10 is an electrical schematic diagram of the interrupt and I/O control circuit which forms part of the front panel processor of FIG. 7.

Referring particularly to FIGS. 7 and 10, the control circuit 243 includes a programmable systems interface circuit 285 which is an integrated circuit model TMS 9901 manufactured by Texas Instruments, Inc. The programmable systems interface circuit 285 communicates with the microprocessor 221 through a communication register unit (inside the microprocessor 221). The connection to this "CRU" register is accomplished by five address select lines (S0-S4) which connect to leads ab10-ab14 in the address bus 222, a CE enable line 286 and three communication register unit control lines CRUIN 287, CRUOUT 288 and CRUCK 289. A selected bit, determined by the state of inputs S0-S4, may be strobed out of the sixteen-bit communication register unit in the microprocessor 221. This data bit appears on the CRUOUT control line 288 when the CRUCK control line 289 is strobed. Similarly, a data bit may be written into this same register through the CRUIN control line 287 when the CRUCK control line 287 is strobed.

The programmable systems interface 285 is also connected to the microprocessor 221 through an interrupt request line (IRQ) 290 and four interrupt code lines (IC0-IC3) indicated at 291. Seven interrupt inputs, INT1-INT7 are connected to receive interrupt requests from various system elements such as the CRT interface circuit 250 (through the INT4 control line 259) and the keyboard interface circuit 235 (through the INT3 control line 242). In addition, a control line INT1 292 connects to the main processor USART 220, and an INT2 control line 293 connects to an auxiliary USART 294. Two additional control lines (INT6 and INT7) 295 and 296 are associated with a tape reader 297.

When one of the control lines INT1-INT7 is driven low the programmable systems interface 285 passes the signal to an internal priority encoder where the highest priority interrupt signal is encoded into a four-bit binary code. This code is generated on the IC0-IC3 control lines 291 to the microprocessor 221 along with an interrupt request on the IRQ control line 290. This four-bit code is employed by the microprocessor 221 to identify which of the peripheral devices or I/O devices is requesting the interrupt.

Referring particularly to FIGS. 7 and 10, whereas the keyboard interface circuit 235 and the CRT interface circuit 250 couple data in parallel to the data bus 223, the main processor USART 220 and the auxiliary USART 294 exchange data serially with the microprocessor 221 via the CRUIN data line 287 and the CRUOUT data line 288. For example, when a byte of data is received by the main processor USART 220 through the cable 9, it requests an interrupt through the INT1 control line 292. When the interrupt request is passed on to the microprocessor 221 by the control circuit 243, the microprocessor 221 jumps to a USART interrupt service routine. Instructions in this routine enable the main processor USART 220 through a control line 298 and sequentially read in the byte of data, one bit at a time, through the CRUIN data line 287. Conversely, when data is to be coupled to the main processor through the cable 9, it is generated to the main processor USART 220 through the CRUOUT data line 288, one bit at a time.

The auxiliary USART 294 may be connected through a cable 300 to a TTY, to the host computer in a DNC system, or to a number of other devices. It operates in the same manner as the USART 220 when enabled through a control line 301.

Referring particularly to FIGS. 7 and 10, the tape reader 297 is connected to the interrupt and I/O control circuit 243 through a data and control cable 305. Nine leads in this cable 305, eight of which are data leads and one of which is a strobe line, connect to the inputs of a nine-bit buffer 306. The nine outputs on the buffer 307 connect to respective inputs P2-P10 on the programmable systems interface 285. The strobe line from the tape reader connects through a gate 307 to the clock input on a D-type flip-flop 308, and when an eight-bit byte of data is received at the buffers 306, the flip-flop 308 is reset by the strobe signal to generate a logic low interrupt signal on the INT6 control line 295. A tape reader service routine is executed by the microprocessor 221 when this interrupt request is passed on by the programmable systems interface 285 and the eight-bit byte of tape reader data is input to the microprocessor 221 serially through the CRUIN data line 287. Also, a NAND gate 309 has its inputs connected to the nine outputs of the buffer 306 and its output is coupled through a gate 310 to the clock terminal of a D-type flip-flop 311. When the nine leads are all at a logic high voltage indicating an intercharacter gap, the flip-flop 311 is reset to generate a logic low interrupt request through the INT7 control line 296. This is used in conjunction with the data strobe to determine whether the tape reader is operating properly. When the interrupts generated by the tape reader are acknowledged by the microprocessor 221, the routines which service them include instructions that reset the respective flip-flops 308 and 311 through a CKOFF control line 312 and a LREX control line 313.

The tape reader 297 is controlled by a two-bit binary code which is generated at a pair of outputs P0 and P1 on the programmable systems interface 285. The P1 output is connected to one input on a NAND gate 316 and through inverter gates 314 and 317 to inputs on NAND gates 315 and 318. The P0 output connects to a second input on NAND gate 318 and it connects through inverter gates 323 and 319 to second inputs on NAND gates 315 and 316. The output of the NAND gate 315 connects to the tape reader 297 through an FWD control line 320 and when it is driven to a logic low voltage, the tape reader is run in the forward direction. The output of the NAND gate 316 drives a REV control line 322 which connects to the tape reader 297 and operates it in the reverse direction when driven to a logic low voltage. The output of the NAND gate 318 connects to a REWIND control line 321 which rewinds the tape on the tape reader 297 when driven to a logic low voltage. The tape reader control lines 320-322 are operated by the microprocessor 221 in response to the execution of machine instructions which control the outputs P1 and P0 on the programmable systems interface 285 through the CRUOUT data line 288.

Referring still to FIG. 10, the interrupt and I/O control circuit 243 also includes a watchdog timer circuit. This circuit contains a monostable multivibrator 325 which has its input connected to a WDOG control line 326 and its Q output connected to the set terminal on an RS flip-flop 327. The reset terminal on the flip-flop 327 connects to a logic high voltage source and its Q output connects through an inverter gate 328 to an INT5 control line 329 that connects with the programmable systems interface 285. The output of the inverter gate 328 also connects through a second inverter gate 330 to a light emitting diode 331 and to the fault monitor line 243. The monostable multivibrator 325 is clocked through a WDOG control line 326 and when the front panel processor is operating normally, it will be clocked again before a logic high pulse is generated at its Q output (i.e., within 100 milliseconds) and it will reset. If a malfunction should occur, however, and the monostable multivibrator 325 is not clocked within 100 milliseconds, the flip-flop 327 is set and an interrupt is generated through the INT5 control line 329. Simultaneously, the light emitting diode 331 is de-energized to provide a visual indication of the malfunction and the fault monitor line 243 is pulled low. When the malfunction has been corrected, the flip-flop 327 in the watchdog timer circuit is reset through an RES DOG control line 332.

Figure 11:
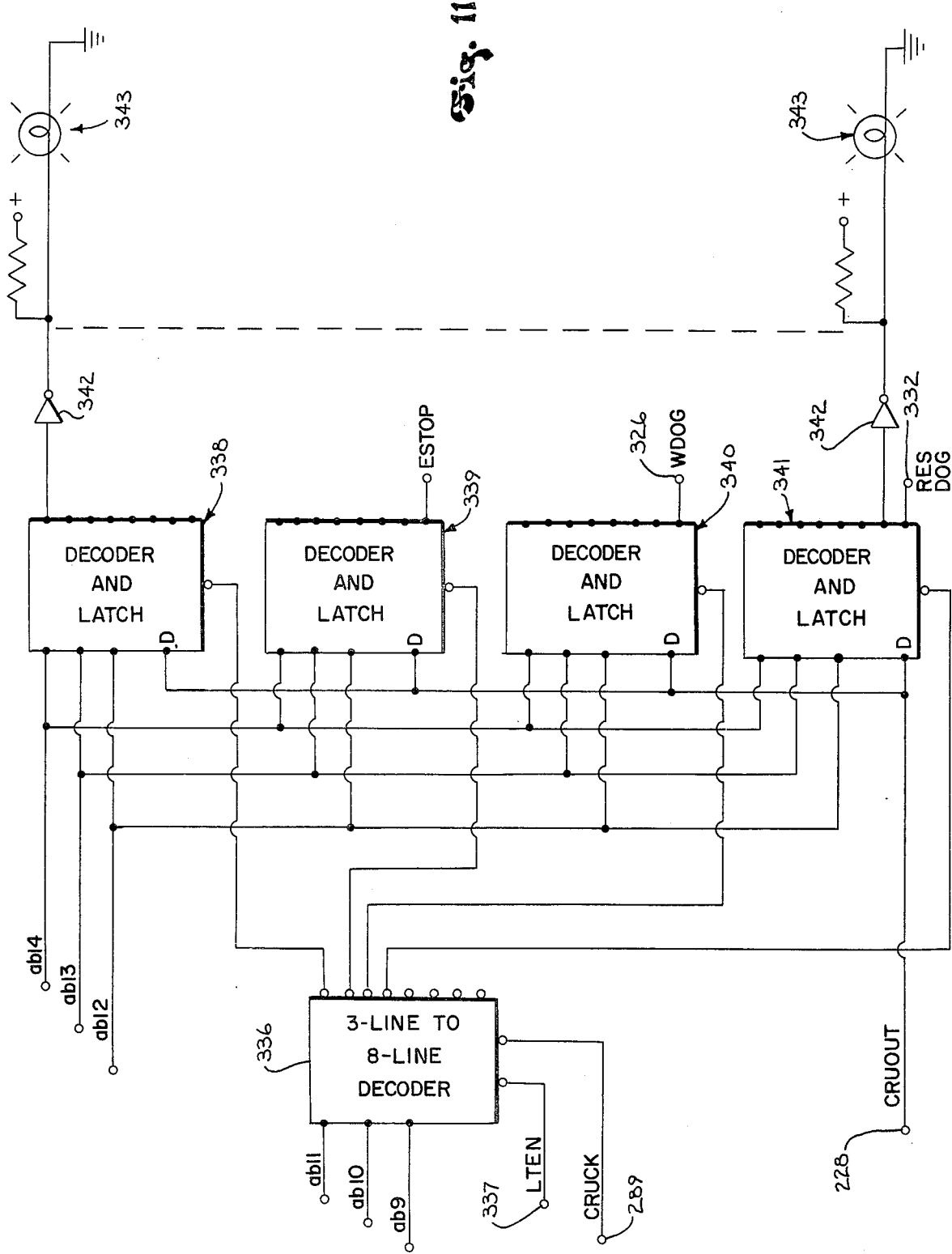
FIG. 11 is an electrical schematic diagram of the control panel light driver circuit which forms part of the front panel processor of FIG. 7.

Referring particularly to FIGS. 7 and 11, data is output from the microprocessor 221 to a control panel light driver circuit 335 via the CRUOUT data line 228. More specifically, a first 3-line-to-8-line decoder circuit 336 has a set of inputs connected to the leads ab9-ab11 in the address bus 222, and its enable terminal is connected to a LTEN control line 337. An enable terminal on the 3-line-to-8-line decoder 336 connects to the CRUCK control line 289. Four of the eight output terminals on the 3-line-to-8-line decoder circuit 336 are connected to respective clock terminals on four 3-line-to-8-line decoder/latch circuits 338-341. The three inputs on each of the circuits 338-341 connect to the respective leads ab12-ab14 in the address bus 222 and their D input terminals connect to the CRUOUT data line 228. The output terminals on each of the decoder and latch circuits 338-341 are connected through inverter gates 342 to energize selected lights 343 on the pendent control station 2. One of these outputs on the decoder and latch circuit 340 connects to the WDOG control line 326 and an output on the decoder and latch circuit 341 connects to the RES DOG control line 332.

When the 3-line-to-8-line decoder circuit 336 is enabled by the LTEN control line 337 and a timing pulse is received on the CRUCK control line 289, one of the four decoder and latch circuits 338-341 is enabled by the three-bit code on the leads ab9-ab11 of the address bus 222. Simultaneously, one of the eight output terminals on the enabled decoder and latch circuit 338-341 is selected by the three-bit code on the leads ab12-ab14 of the address bus 222. One bit of data is thus clocked into the enabled decoder and latch circuit through the CRUOUT data line 228. In this manner, a selected one of the lights 343 on the pendent control station 2 can be energized or deenergized in response to instructions executed by the microprocessor 221. Also, one such instruction is periodically executed by the microprocessor 221 to restart the watchdog timer circuit and another such instruction is executed to reset the watchdog timer.

Figure 8:
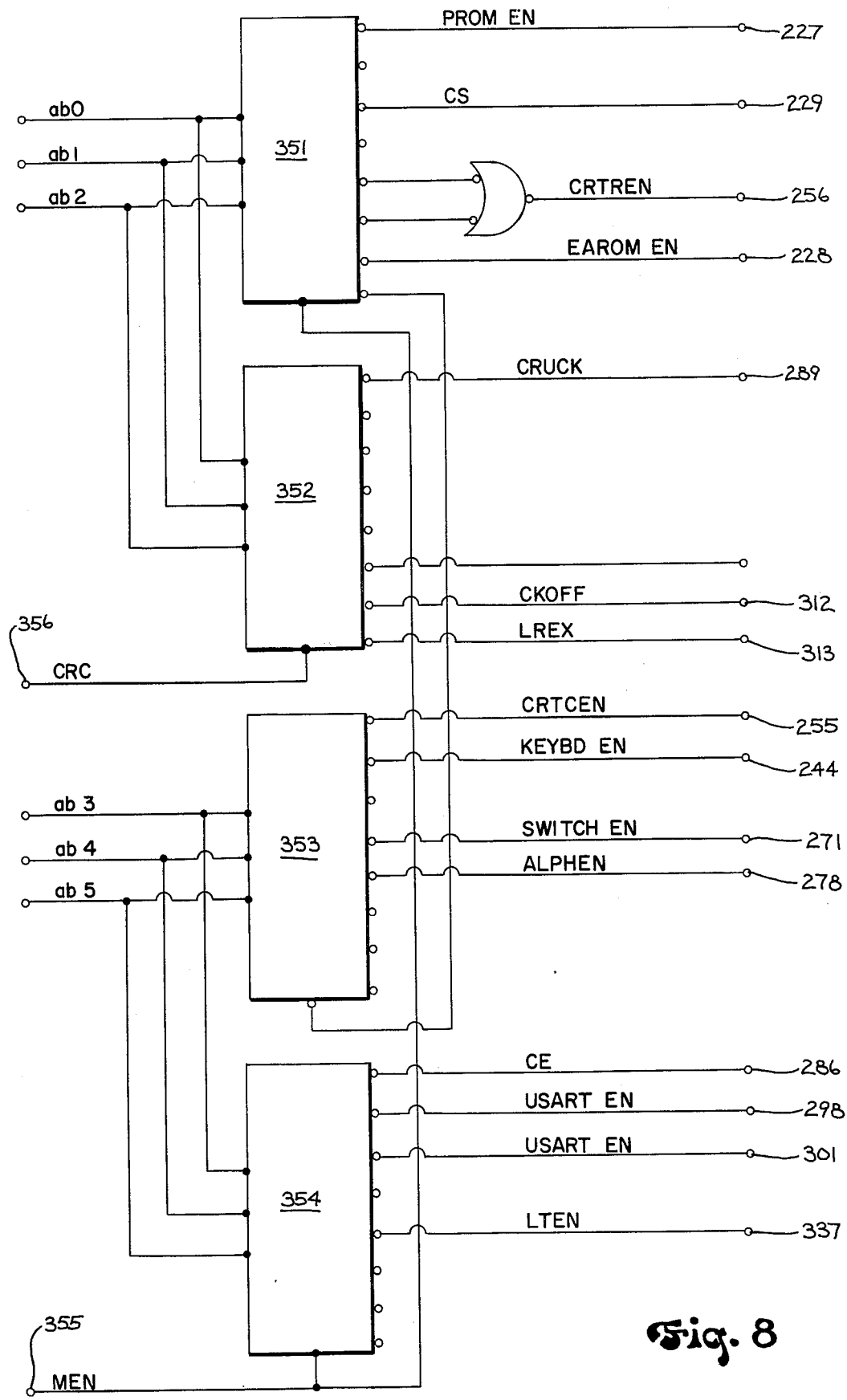
FIG. 8 is an electrical schematic diagram of the decoding and control circuit which forms part of the processor of FIG. 7.

Referring particularly to FIGS. 7 and 8, the control lines which enable the various front panel processor elements described above are for the most part driven by a front panel decoding and control circuit 350. The decoding and control circuit 350 is comprised primarily of four 3-line-to-8-line decoder circuits 351-354 and these are selectively connected to the leads ab0-ab5 of the address bus 222. The decoders 351 and 354 are enabled by a MEN control line 355 whereas the decoder circuit 352 is enabled by the microprocessor 221 through a CRC control line 356. The outputs of the decoders 351-354 drive the front panel processor control lines as shown in FIG. 8. The instructions which are executed by the microprocessor 221 to operate the various elements of the front panel processor through these control lines include selected operation codes and operands. For a detailed description of the operation codes which operate the microprocessor control lines reference is made to *TMS 9900 Microprocessor Data Manual* published in 1976 by Texas Instruments, Inc.

SYSTEM OPERATION

Referring particularly to FIG. 2, the numerical control system of the present invention performs numerous functions. Part program data is input to the front panel processor from the tape reader 297 and is coupled through the cable 9 to the main processor. The "blocks" of part program data are stored in the main processor random access memory 29. Operator commands are also received by the front panel processor from the keyboard 14 and the switches 15. These commands are also coupled to the main processor and the microprocessor 25 processes these commands to operate the numerical control system as directed.

When the numerical control system is running a part program, the blocks of part program data are read from the random access memory 29 (128 bytes at a time). A block of part program data may include codes which must be decoded, dimensions which indicate the distances the cutting tool is to be moved, and numbers which indicate the feed rate at which the cutting tool is to be moved. The codes may also direct that such auxiliary functions as a tool change, pallet change, coolant on, etc. should be performed, and when these are decoded, a designated flag is set in the programmable interface image table 105 stored in the random access memory 29. As will be explained, the contents of the programmable interface image table 105 are periodically transferred to the programmable interface circuit 75 to indicate that the particular auxiliary function is to be performed.

The dimensions and numbers in a part program are employed by the microprocessor 25 to calculate a distance which the cutting tool is to move along each axis of machine tool motion in a single 25.6 millisecond iteration. These distances are stored in active buffers in the random access memory 29 and they are employed every 25.6 milliseconds by the microprocessor 25 under the direction of an interpolation routine to calculate the motion command signals which are output to the servomechanism interface circuit 7.

Figure 12:
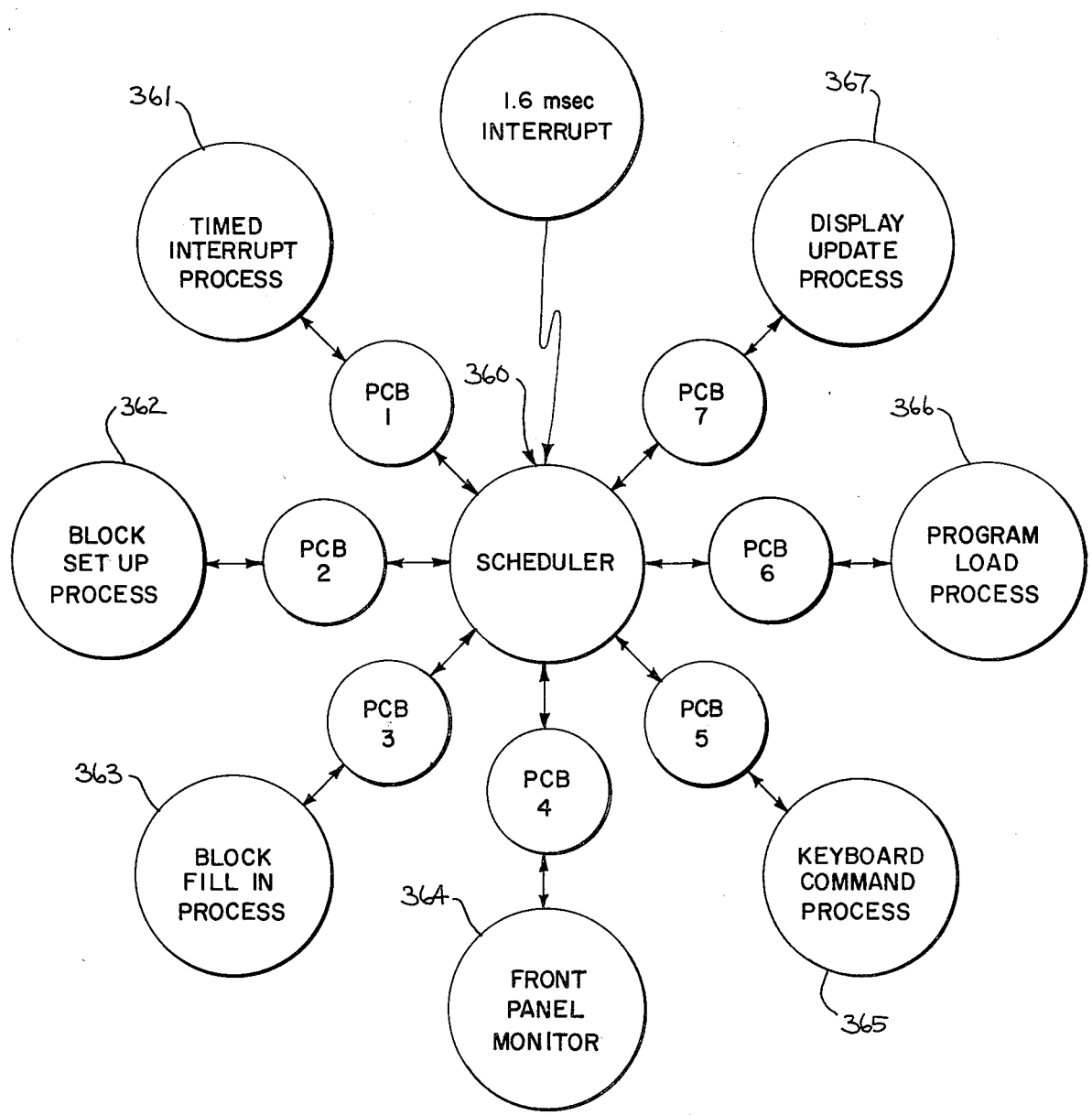
FIG. 12 is a schematic diagram of the main processor operating system.

The control of these and other functions resides in the main microprocessor 25 which operates under the direction of a scheduler routine that is stored in the read-only memory 30. Referring particularly to FIGS. 2 and 12, the scheduler routine, or scheduler, is indicated schematically at 360 and it is entered at least once every 1.6 milliseconds when the microprocessor 25 responds to the interrupt generated by the real time clock 50. The various functions which the main processor is to perform are collected into seven general processes and it is the function of the scheduler 360 to allocate 1.6 millisecond "time slices" to each of these processes on a round-robin basis. These seven processes are identified herein as follows: timed interrupt process 361; block set up process 362; block fillin process 363; front panel monitor 364; keyboard command process 365; program load process 366; and display update process 367. The scheduler 360 has sixteen 1.6 millisecond time slices (16×1.6=25.6) which it can allocate to these processes during each iteration period. The number of allocatable time slices remaining during any 25.6 millisecond iteration period is retained in a counter (ITRS) which is stored in the random access memory 29.

The order in which the processes are executed and the number of time slices allocated to each during a 25.6 millisecond iteration period are indicated in a schedule queue 368. The schedule queue 368 is stored in the read-only memory 30. Associated with each of the processes listed in the schedule queue 368 is a process control block (PCB) which is stored in the random access memory 29 and which contains data concerning the status of the process.

A register (PCBIDX) located in the random access memory 29 is an index to the current, or active, line in the schedule queue 368. This register is employed by the scheduler routine 360 to sequentially activate the processes. For example, PCBIDX points to the first line in the schedule queue 368 at the beginning of each iteration period and the timed interrupt process 261 is thus activated through its associated process control block (PCB1). Since the timed interrupt process 361 must be executed to completion, an excessive number of time slices are allocated to it. However, under normal operating conditions the timed interrupt process is completed in fewer than sixteen time slices and there will be a number of time slices remaining in each 25.6 millisecond iteration period to service other processes. When a process is completed or when it uses up its allocated time, the scheduler 360 is called and the register PCBIDX is incremented to point to the next line in the schedule queue 368. For example, after the timed interrupt process is completed, the block set up process 362 is activated through its associated process control block (PCB2) and the remaining time slices in the iteration period are used up if necessary to complete this process. The remaining processes are similarly activated when time becomes available during any iteration period in the order listed in the schedule queue 368. A dummy process (not shown in the drawings) is also included in the system in the event that no process can be executed. This dummy process is a wait loop which is executed until the start of the next iteration period.

The process control blocks (PCB1-PCB7) store data which provides to the scheduler 360 the status of the respective processes 361-367. The first line of each process control block stores inhibit flags, which when set, indicate to the scheduler 360 that the process is not to be executed. More particularly, bit 0 is an inhibit flag (IOW) which is set when the process requests I/O and specifies its willingness to await completion of the I/O operation, bit 1 is an inhibit flag (CIW) which is set by the scheduler when it receives an inhibit request from the process which indicates that it is not to be executed during the present 25.6 millisecond iteration period, and bit 2 is an inhibit flag (PRW) which indicates that the process is to remain inhibited until it is reactivated, or enabled, by another process. As the scheduler 360 sequences through the schedule queue 368, it interrogates the inhibit flags in the active process control block to determine if its associated process should be executed.

The second word in each process control block (PCB1-PCB7) serves as a counter (CSC) which indicates to the scheduler the number of allocated time slices remaining before the next process on the round robin must be activated. When a process is activated, one of the first functions the scheduler performs is to load this counter (CSC) with the number of allocated time slices indicated for that process in the schedule queue 368. Then, as 1.6 millisecond interrupts occur, the time slice counter (CSC) is decremented, and when it reaches zero, control is returned to the scheduler 360.

The remaining four lines of each process control block (PCB1-PCB7) store data which indicates the status of the process when control is returned from it to the scheduler 360. More specifically, line three stores the contents of a memory extension register (MXR), line four stores the contents of a workpiece pointer (WP), line five stores the contents of a program status register (ST). This data is loaded into the process control block by the scheduler 360 when the activated process is interrupted by the 1.6 millisecond clock or whenever the process exits and is "blocked" by an inhibit bit. When the process is reactivated by the scheduler 360, therefore, the contents of these four lines in the process control block can be reloaded into the appropriate microprocessor registers and the execution of the process can continue from the point where it left off.

The scheduler 360 provides a flexible and efficient means of allocating time to the various functions which the main processor must perform. Processes, and hence functions, may be added or deleted from the system merely by making additions or subtractions from the schedule queue 368. Priorities can be altered by changing the order of the schedule queue entries or the time slice allocations. For a more detailed description of the scheduler 360, reference is made to the above cited copending application "Multiprocessor Numerical Control System."

Figure 13A:
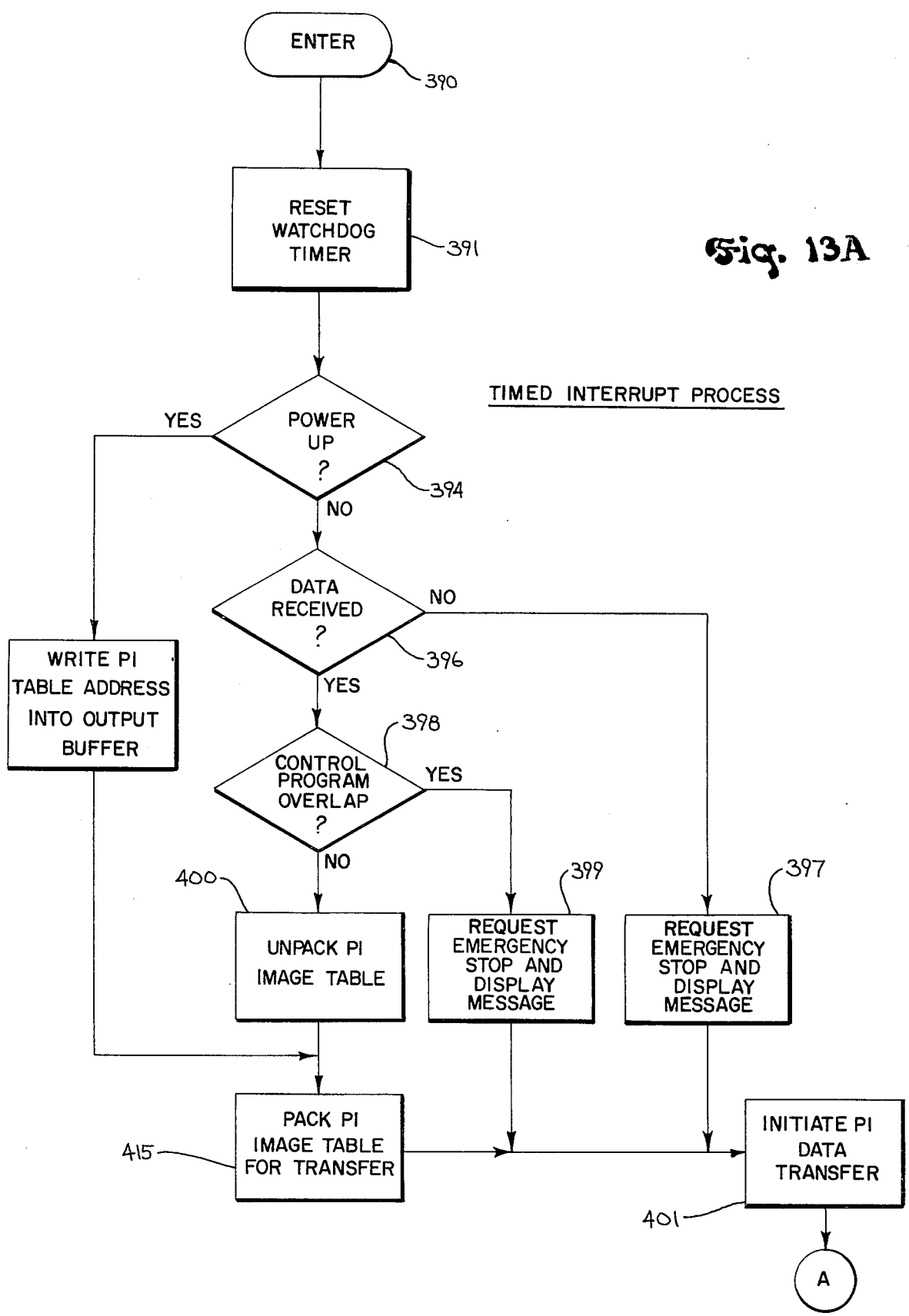
FIGS. 13A and 13B is a flow chart of the timed interrupt process which forms part of the system of FIG. 12.

Referring to FIGS. 2, 12 and 13, the timed interrupt process functions to output motion commands to the servo-mechanism interface circuits 7 and to exchange data with the programmable interface circuit 75 once during every 25.6 millisecond iteration period. Referring particularly to FIG. 13A, the timed interrupt process is entered from the scheduler 360 at the beginning of each iteration period at the point 390. The first function it performs is to reset the watchdog timer in the main processor as indicated by process block 391. Next, it determines if the system is being powered up, as indicated by decision block 394, and if so, the starting address of the programmable interface image table 105 in the random access memory 29 is written into the data latch 124 in the DMA circuit 110 (see FIG. 4). This enables the programmable interface circuit 75 to address the proper memory address so that it can subsequently exchange data with the programmable interface image table 105.

After power up, the timed interrupt process prepares to initiate a data transfer with the programmable interface circuit 75. First, it checks to see whether data was received from the programmable interface circuit 75 during the previous iteration period, as indicated by decision block 396. If not, a malfunction has occurred and the system branches to a process block 397 which requests an emergency stop and loads an appropriate message into a display buffer for transmittal to the front panel processor. Otherwise, the system checks a control program overlap flag as indicated by decision block 398 to determine if the programmable interface processor completed its functions during the previous iteration period. If it did not, an emergency stop is requested and a suitable message is displayed as indicated by process block 399. The "data received" and "control program overlap" indicators are stored in the programmable interface image table 105. They are set by the programmable interface circuit 75.

Under normal circumstances, instructions indicated by process block 400 are executed next to unpack data written into the programmable interface image table 105 by the programmable interface circuit 75 during the previous iteration. This data is dispersed to various locations in the random access memory 29 for use by other programs. Next, data is assembled from various locations in the random access memory 29 and stored at specified locations of the programmable interface image table 105 as indicated by process block 415. Such data may be generated by the block set up process from the part program and may include, for example, an indication that an auxiliary function such as a tool change or a pallet change is to occur. After this data has been assembled in the PI image table 105, an instruction indicated by process block 401 is executed by the main processor to initiate the data transfer between it and the programmable interface circuit 75. As indicated previously, this instruction generates a non-maskable interrupt to the programmable interface microprocessor 85. The programmable interface circuit 75 subsequently requests a DMA from the main microprocessor 25 and the main microprocessor 25 releases its data bus 27, address bus 26, and control lines WE and RD to the programmable interface circuit 75. As will be described in more detail hereinafter, the programmable interface 75 then transfers thirty-three 16-bit words of data from the PI image table 105 in the main processor memory 29 to the PI image table 106 in the programmable interface memory 88. Later, during the same iteration period, the programmable interface circuit 75 transfers thirty-three 16-bit words of data back from the PI image table 106 in memory 88 to the PI image table 105 in the memory 29. The data thus transferred is indicated schematically in FIG. 28.

Figure 13B:
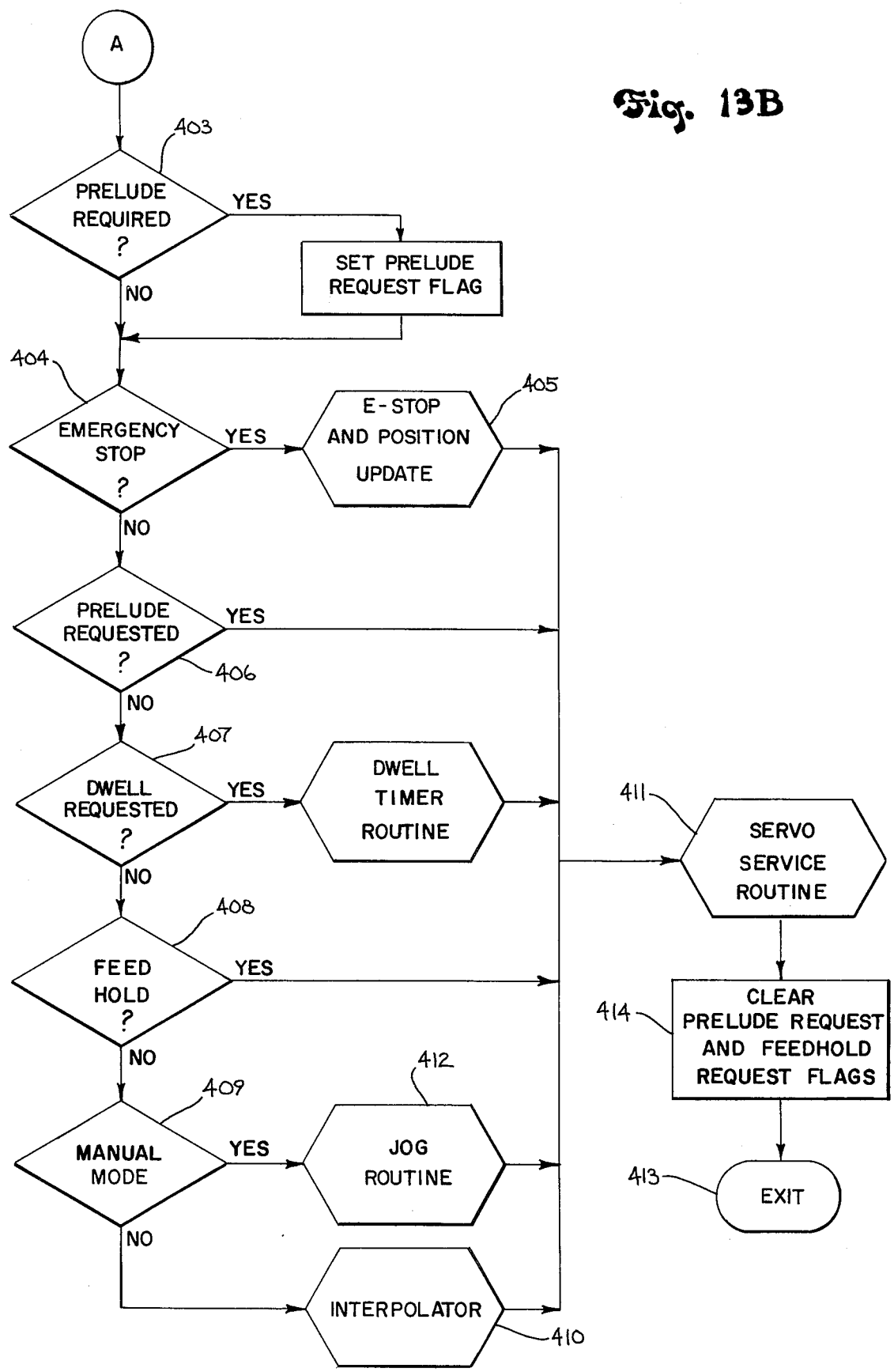

Referring particularly to FIG. 13B, after the exchange of data with the programmable interface circuit 75 has been initiated, the main processor continues to execute instructions in the timed interrupt process. The next step in this process is to determine if a "prelude" flag has been set as indicated by decision block 403. A prelude is always requested during the first iteration period of any part program block which contains an S-word, a T-word, or certain M codes defined in EIA standard RS-274-C. This gives the programmable interface circuit 75 an opportunity to act on the S, T or M code at the beginning of the block before interpolation begins.

The system next executes instructions indicated by decision block 404 to determine whether the emergency stop flag has been set. If so, an emergency stop and position update routine 405 is executed. Otherwise, the prelude flag is checked at decision block 406 and the "dwell" flag is checked at decision block 407. If neither of these flags is set the "feed hold" flag is checked at decision block 408 and the "manual mode" flag is checked at decision block 409.

If none of these flags are set the interpolation routine 410 is entered and is executed to its completion to generate an incremental motion command number for each axis of motion on the machine tool being controlled. A servo-service routine 411 is then executed to output the motion command signals to the servo-mechanism interface circuit 7 as indicated at 411. If the interpolator 410 is bypassed, either no incremental motion command numbers are calculated, or motion command numbers are calculated by a jog routine 412 which is responsive to operator commands. In any case, after the newly calculated motion commands are outout to the servomechanism interface circuit 7, the prelude request and feedhold request flags are reset as indicated by process block 414 and the system exits at 413 back to the scheduler 360.

Referring particularly to FIGS. 1 and 3, the programmable interface processor is programmed to operate as a programmable controller. Macroinstructions such as those employed in programmable controllers are stored in the random access memory 94 as a control program 464. These instructions are loaded into the memory 94 by an operator who uses the keyboard 18 on the program panel station 3. The macroinstructions are read into the microprocessor 85 from the USART 103 and then written into the random access memory 94 through the gates 97. The program loader routine for accomplishing this is stored in the read-only memory 88 and it is called up when the mode switch 200 (FIG. 6) is set to its "LOAD" position.

When executed the macronistructions which form the control program 464 perform a number of well known functions, including examining the state of selected bits in the programmable interface image table 106 and the I/O image table 107. Logical operations are performed by some macroinstructions and others set the state of selected bits in the image tables 106 and 107 in accordance with the results of the logical operations. The macroinstruction set is essentially the same as that described in U.S. Pat. No. 3,942,158 entitled "Programmable Logic Controller."

The user develops a control program using these macroinstructions. Such a program includes instructions which examine the state of the programmable interface image table 106 to determine whether an auxiliary function such as a tool change or pallet change has been indicated by the part program being processed by the main processor. It also includes instructions which examine the status of selected locations in the I/O image table 107 to determine whether sensing devices on the machine tool such as limit switches are in the proper state to allow a tool change or pallet change to occur. The B register in the microprocessor 85 is used to store the result of such examination instructions, and when conditions are proper, other control program instructions set the state of the appropriate bit in the I/O image table 107. When the I/O image table 107 is subsequently output to the I/O interface circuit 8, the appropriate operating device is thus energized or deenergized to carry out the indicated function.

For each of the macroinstruction operation codes there is stored in the read-only memory 88 a macroinstruction interpreter routine. When the programmable interface mode switch 200 is in its "RUN" position, the microprocessor 85 repeatedly executes a FETCH routine that sequentially reads the control program macroinstructions out of the memory 94. Each macroinstruction operation code is converted by the mapping prom 100 to a number which indicates the starting address of its macroinstruction interpreter routine. The system jumps to the indicated macroinstruction interpreter routine and executes it to perform one of the functions listed above. Each interpreter routine is comprised of a set of machine instructions selected from the Z-80 microprocessor instruction set.

Figure 5:
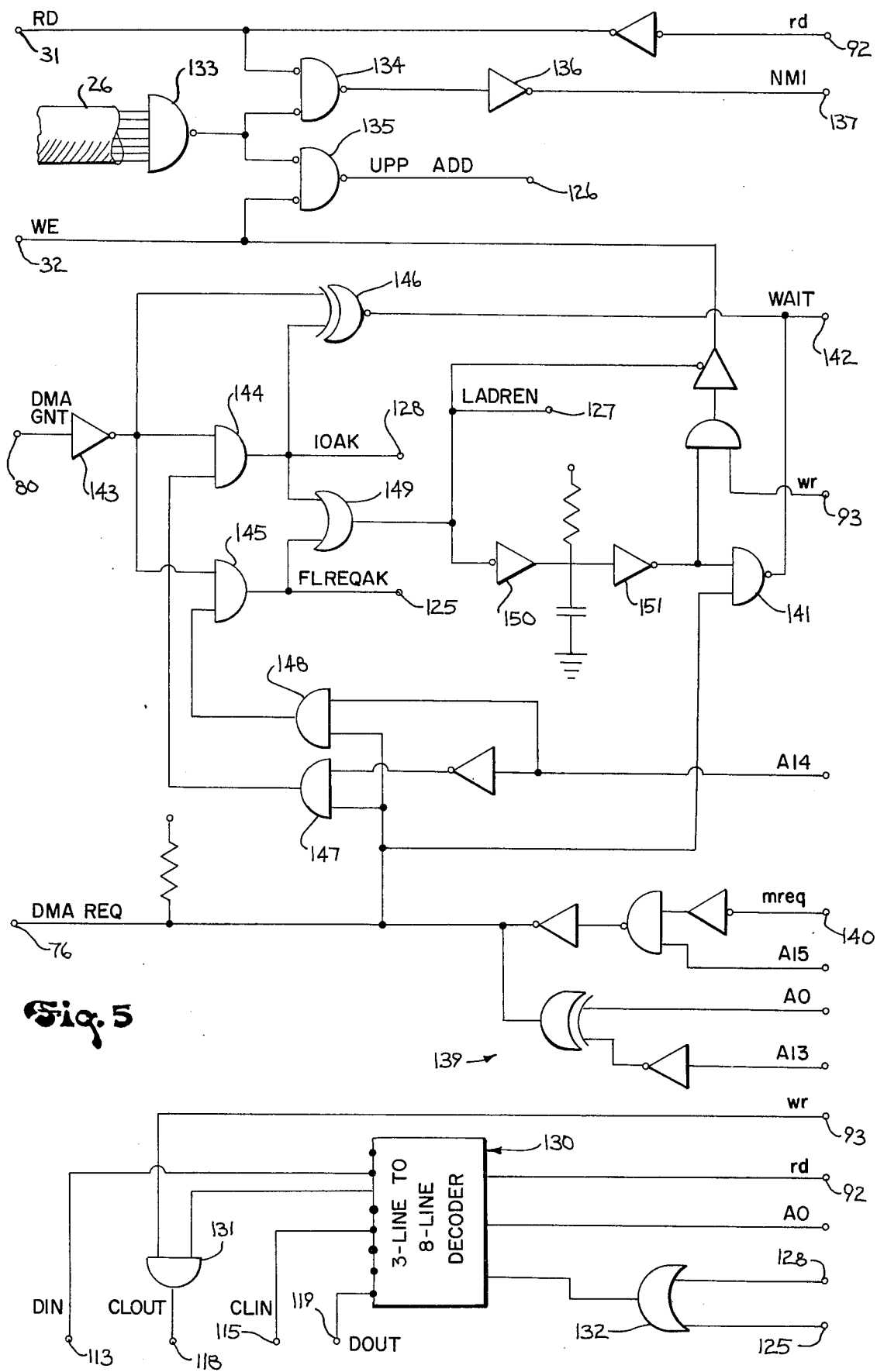
FIG. 5 is an electrical schematic diagram of the decoding and control circuit which forms part of the DMA circuit of FIG. 4.

The execution of the control program 464, the coupling of data between the image tables, the main processor and the I/O interface circuit 8 are synchronized with the operation of the main processor. Referring particularly to FIGS. 3 and 5, at the beginning of each 25.6 millisecond iteration period the main processor, as part of the timed interrupt process, addresses the NAND gate 133 in the DMA decoding and control circuit 114. This generates an interrupt signal on the NMI control line 137 which is applied to the microprocessor 85.

Figure 14A:
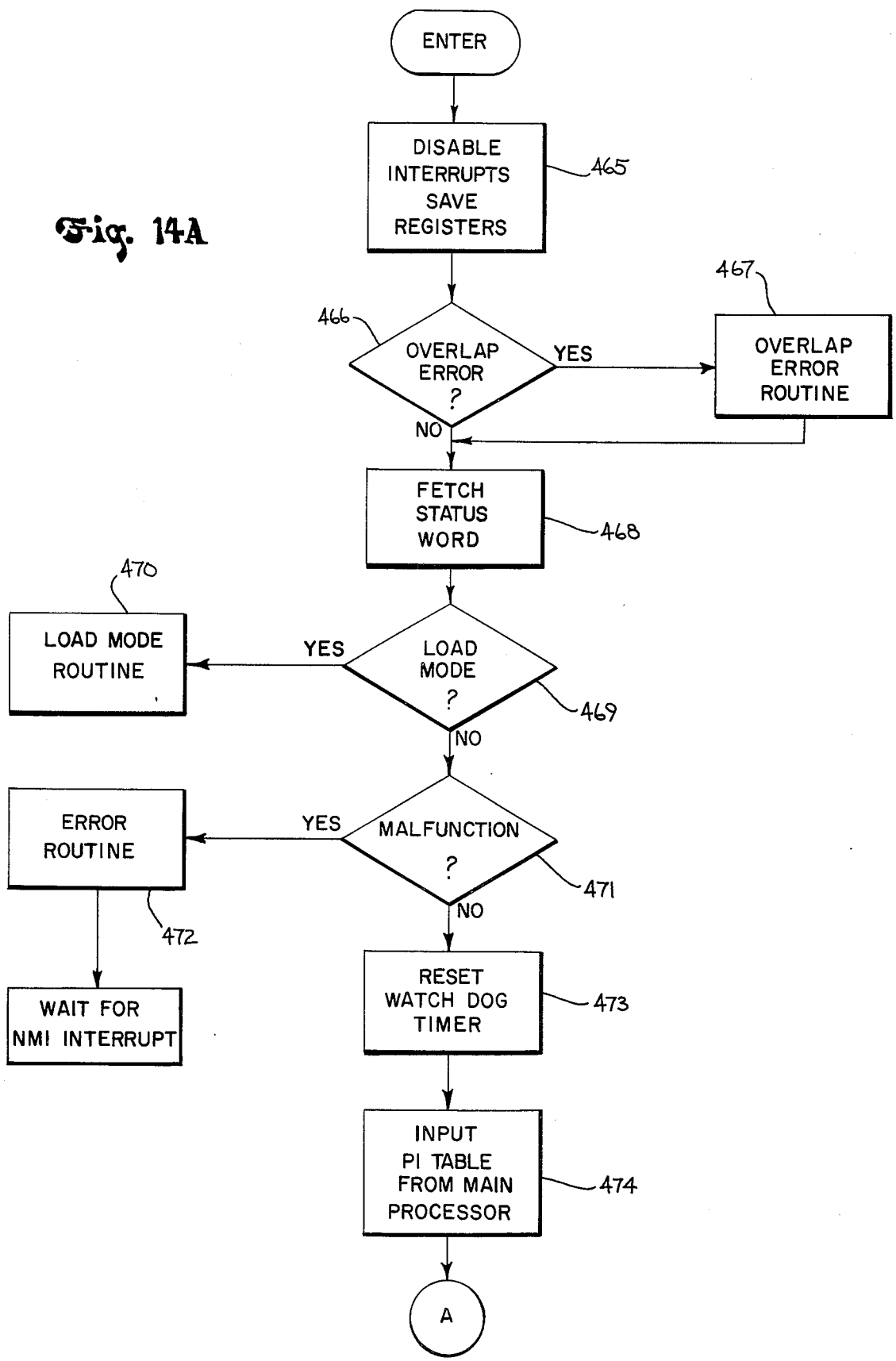

Referring to FIG. 14, the microprocessor 85 responds to this interrupt by executing an NMI service routine. It includes a set of instructions indicated collectively by a process block 465 which when executed disable further interrupts and save the contents of the microprocessor registers. Bit 7 in the microprocessor B register is then examined as indicated by decision block 466 to determine if the overlap bit has been reset. If not, an error has occurred and the system branches to an overlap error routine indicated by process block 467, which stores an overlap error flag for later transmission to the main processor. When received by the main processor such an overlap error flag causes a message to be output to the display on the pendent station 2 as described above.

The NMI control line 137 can be driven low by other system elements, including the watchdog timer circuit 170. To determine the cause of the NMI, the status word is input next from the gates 175 (see FIG. 6) as indicated by process block 468, and the contents are examined. If the system is in the LOAD mode as determined by decision block 469, the system branches to a load mode routine indicated by process block 470. If a parity error has occurred or the watchdog timer has timed out as determined by decision block 471, the system branches to an error routine indicated by process block 472. The error routine checks to determine if the malfunction is on the programmable interface board 6 or elsewhere in the system. If the malfunction is on the programmable interface board 6, remedial action as described in copending patent application Ser. No. 971,593, filed on Dec. 20, 1978 and entitle "Programmable Controller With Data Archive" is taken. If the fault is not detected in the programmable interface circuit, if is assumed to be elsewhere in the system and the programmable interface circuit stops until another NMI occurs.

When the system is in the RUN mode and operating properly, the watchdog timer (i.e., monostable multivibrator 170 in FIG. 6) is reset by an instruction indicated by process block 473 each time an NMI occurs. A routine indicated by process block 474 is then executed to input thirty-four 16-bit words from the main processor programmable interface (PI) table 105. These thirty-four words are stored as sixty-eight 8-bit words in the programmable interface processor image table 106. This data transfer is done using a block transfer instruction which addresses the main processor memory 29 through the DMA circuit 110, and sequentially reads thirty-four lines therefrom. Each such memory read operation requires less than two microseconds so that the main processor is not tied up for significant amounts of time.

Following the receipt of data from the main processor PI image table 105, the programmable interface processor performs an I/O scan in which data is coupled between its I/O image table 107 and the I/O interface circuit 8. This is indicated in FIG. 14B by processor block 465, which includes instructions that sequentially read 8-bit words from the I/O image table 107 and couple them through the DMA circuit 110 to the main processor data bus 27. For each two of these 8-bit I/O image table words there is a corresponding 16-bit output circuit board to which the data is applied. Following the output scan an input scan is performed in which the I/O interface circuits 8 are sequentially addressed through the DAM circuit 110 and 16-bit data words indicating the state, or status of discrete devices on the controlled machine are input. These 16-bit data words are each stored on two associated lines in the I/O image table 107. Although the amount of time the main processor is inactive during this DMA data transfer varies depending in the number of I/O devices being serviced, typically it requires less than two microseconds for each read and write operation involving the I/O interface circuits 8. The programmable interface circuit 75 thus places very little time burden on the main processor.

Referring again to FIG. 14B, after the I/O scan has been completed an overlap bit is set (i.e., Bit 7 in the microprocessor B register) as indicated by process block 476, and the system jumps to the FETCH routine as indicated by process block 477 to read out and execute the first macroinstruction in the control program. The servicing of the NMI interrupt is completed at this juncture and the programmable interface processor proceeds to sequentially execute the control program macroinstructions as indicated by process block 478.

Referring particularly to FIGS. 2, 3 and 14B, the last macroinstruction in the control program is an END macroinstruction. When this is fetched, it is mapped into its interpreter routine as indicated by process block 479. One of the first functions of the END interpreter routine is to output sixty-eight 8-bit status words from the PI image table 106 to the main processor PI image table 105. Included with these status words is the "overlap" flag and the "data transmitted" flag. Direct memory access is requested from the main processor to perform this transfer and the transfer is accomplished using the block transfer instruction in the Zilog Z-80 microprocessor instruction set as indicated by process block 480. As indicated by process block 481, the overlap bit is then reset to indicate that the entire control program has been executed and the macroinstruction program counter (i.e., stack pointer) is reset to point at the first macroinstruction in the control program. The programmable interface processor then waits for the next NMI interrupt to occur during the next 25.6 millisecond iteration period.

Whereas the programmable interface processor interfaces the numerical control system with the discrete I/O devices on the machine tool, the front panel processor operates the peripheral devices which interface the numerical control system with the operator. As with the programmable interface processor, the front panel processor removes a considerable time burden from the main processor and it allows flexibility in the type and number of peripheral devices which are employed. The front panel processor also facilitates the addition of one further feature not found in prior numerical control systems, the peripheral devices can be assembled in a separate, remotely located pendent station.

Figure 15:
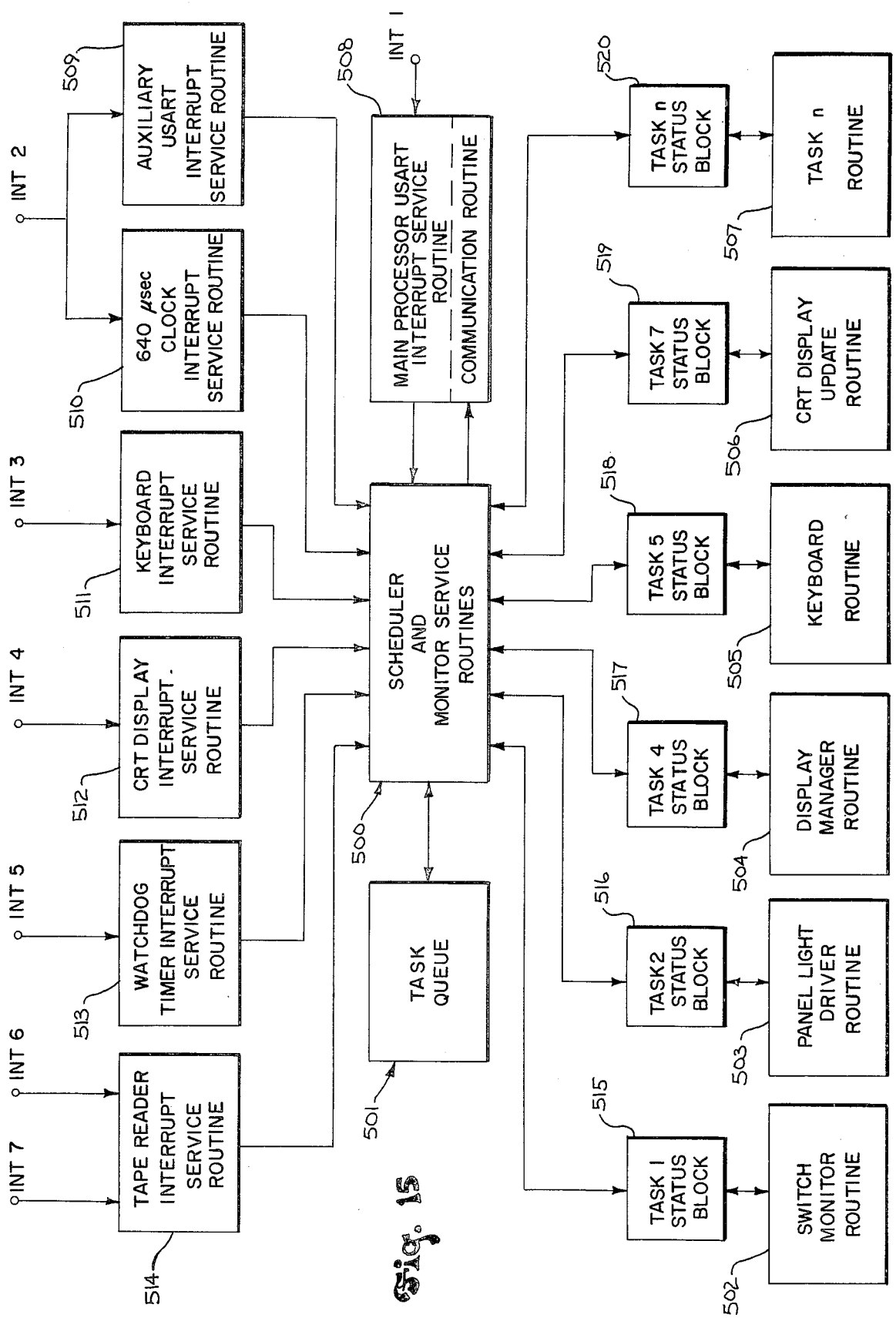
FIG. 15 is a schematic diagram of the front panel processor software system.

Referring particularly to FIG. 15, the front panel processor is an event-driven system which includes an operating system indicated at 500 which is comprised of a scheduler routine and a set of monitor service routines. The scheduler portion of the operating system 500 recognizes front panel processor events as they occur and in response to these events it selects tasks to be performed. When more than one task is capable of being executed at any point in time, the task with the highest priority is executed first. A list of such tasks along with their priority is stored in a task queue 501.

The number and nature of the tasks performed by the front panel processor may vary considerably depending on the particular options selected by the user. In the preferred embodiment illustrated in FIG. 15, these tasks include: a switch monitor routine 502; a panel light driver routine 503; a display manager routine 504; a keyboard routine 505; and a CRT display update routine 506. An additional task indicated at 507 and labeled "Task n Routine" is intended to illustrate that other tasks may also be executed by the front panel processor.

The front panel processor operating system 500 recognizes eighteen different events. Many of these events are generated by the routine 502-507 as they execute their tasks and others are generated by the front panel processor hardware. Referring particularly to FIGS. 7 and 15, interrupts generated by the main processor USART 220, the auxiliary USART 294, the keyboard interface 235, the CRT interface 250 and the tape reader 297 are each linked to the scheduler by associated interrupt service routines. As explained previously, the microprocessor 221 is vectored to the proper interrupt service routine by the four-bit code generated on the bus 291 by the interrupt and I/O control circuit 243. More specifically, an interrupt on the INT1 control line vectors the microprocessor 221 to a main processor USART service routine indicated at 508, the interrupt generated on control line INT2 vectors into either an auxiliary USART interrupt service routine 509 or a 640 microsecond clock interrupt service routine 510. An interrupt generated on the control line INT3 vectors the microprocessor 221 to a keyboard interrupt service routine 511 and an interrupt generated on the INT4 line vectors the system to a CRT display interrupt service routine 512. An interrupt on the control line INT5 vectors the system to a watchdog timer interrupt service routine 513 and interrupts on the control lines INT6 and INT7 vector the system to a tape reader interrupt service routine 514.

The interrupt service routines 508-514 report to the scheduler in the operating system 500. These reports include a first number which indicates the event that has occurred, and a second number which identifies a specific related task. The scheduler uses these two numbers as indices into tables that define what is to happen next.

Referring to FIG. 15, a task may be activated and only partially executed before being deactivated. In no case is a task allowed to execute more than five milliseconds at one time, and typically, its execution is either interrupted by an event or the task blocks itself while waiting for an I/O operation to occur. Accordingly, task status blocks 515-520 are stored in the front panel processor memory 226 and are associated respectively with the task routines 502-507.

It is through these task status blocks that the operating system 500 communicates with the task routines. For example, the first line in the task status block includes not only the task number, but also the priority level of that task. When the task is activated by the scheduler, the microprocessor workspace pointer, program counter and status register are preset to the contents of words 5, 6 and 7 of the task status block. The task is thus entered at the proper point. When the task is subsequently deactivated by either itself or the operating system, these same three lines in the task status block are reloaded with current data so that the "task environment" is preserved for later re-entry. If a task deactivates itself, it may also set an inhibit bit in word 1 of the task status block to prevent the task from being re-entered until an indicated event occurs.

Figure 16:
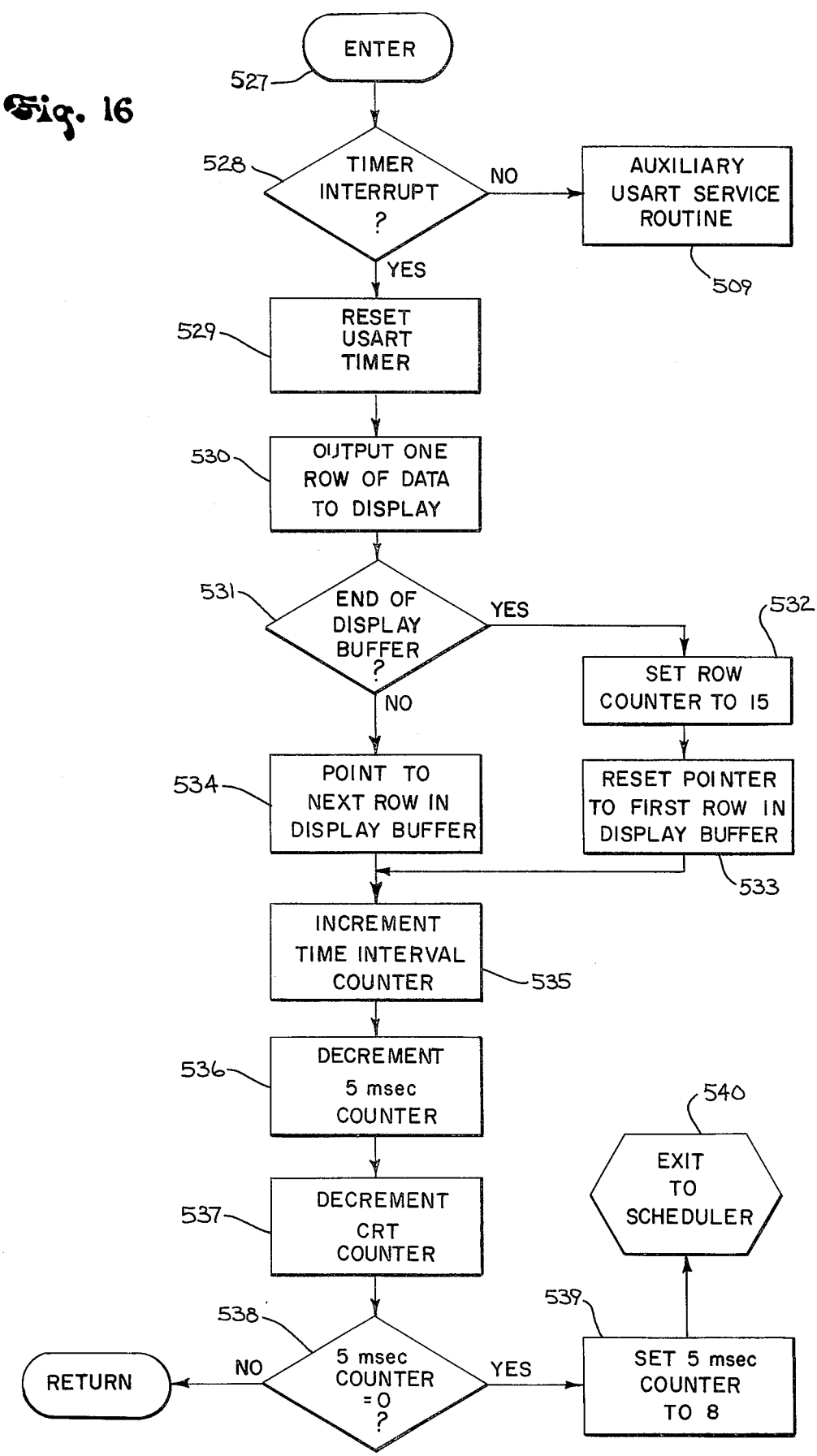
FIG. 16 is a flow chart of the clock interrupt service routine which forms part of the system of FIG. 15.

Referring particularly to FIGS. 7, 15 and 16, there are a number of operations performed by the front panel processor that are time dependent. These include, for example, scanning the state of the front panel switches 15, updating the display 16, and determining the end of the CRT vertical retrace period. Accordingly, the auxiliary USART 294 has been initialized to provide an interrupt at 640 microsecond time intervals on the INT2 control line. This interrupt vectors the microprocessor 221 to the 640 microsecond clock interrupt service routine 510 which is executed to update a number of system clocks.

Referring particularly to FIGS. 7 and 16, the clock interrupt service routine 510 is entered at 527 and the auxiliary USART 294 is checked to determine if the timer caused the interrupt. If not, as determined by decision block 528, the auxiliary USART interrupt service routine 509 is executed. If the timer caused the interrupt, it is then reset as indicated by process block 529 and instructions are executed as indicated by process block 530 to output one 36-bit row of data to the alpha-numeric display 16. This data is stored in a display buffer contained in the RAM 226. There are fourteen rows of display data stored in this buffer and a row pointer is employed to keep track of which data is to be output. As indicated by decision block 531, when a row counter is decremented to zero, the last line in the display buffer has been output and the counter is reset to fifteen as indicated by process block 532 and the pointer is reset to point at the first row in the display buffer, as indicated by process block 533. Otherwise, the row pointer is incremented to point to the next row and the row counter is decremented as indicated by process block 534.

Three time counters are then updated to reflect the additional 640 microsecond time interval. First, as indicated by process block 535, a time interval counter is incremented. Then, a 5 millisecond counter is decremented as indicated by process block 536, and finally, a CRT counter is decremented as indicated by process block 537. The 5 millisecond counter is preset to eight so that when it is counted down to zero, as determined by decision block 583, 5 milliseconds have transpired. The CRT counter is preset to five so that when it is counted down to zero, 3.2 milliseconds have transpired. The CRT counter is preset by the CRT display interrupt service routine at the beginning of each vertical retrace period and it serves, therefore, to determine the time interval during which the CRT display 17 can be updated with new data.

The five millisecond time interval measured by the 5 millisecond counter is required by a number of tasks in the system and this time interval will be referred to hereinafter as one "TIC." When a TIC has occurred, as determined by decision block 538, the 5 millisecond counter is reset to eight as indicated by process block 539 and the event is reported to the scheduler as indicated at 540. Otherwise, the system returns immediately to the routine which was interrupted.

The scheduler responds to this event by "queueing up" any tasks that were put to sleep for a finite number of TICs and that are now ready to be awakened. This procedure occurs every 50 milliseconds, for example, with the switch monitor routine 502. Line five of the task status block 515 for this routine is set with a specific number of TICs and these are counted down by the scheduler as the five millisecond events occur. When line five is counted down to zero, the switch monitor routine 502 is queued up by writing its task number and priority number (i.e., line one of the task status block 514) into the task queue 501.

Referring to FIG. 17, when the switch monitor task is thus awakened by the scheduler, the routine 502 is executed to scan the front panel switches 15 and report any changes to the main processor. The routine is entered at 542 and the first function it performs is to reset the watchdog timer 325 (FIG. 10) as indicated by process block 543. As indicated by process block 544, a row counter is then set to "four," which is the number of rows in the switch matrix (FIG. 13) and the number of rows in the front panel image table 233 (FIG. 7). A row pointer (R1) is then set to the address of the first row in the switch matrix, as indicated by process block 545, and a row pointer (R2) is set to the address of the first line in the front panel image table 233, as indicated by process block 546.

The state of the first switch matrix row is then input to the microprocessor 221 as indicated by process block 547 and it is compared with the first row of the front panel image table 223. If any changes have occurred in the state of the switches 15 since the previous scan, as determined at decision block 548, the new switch state is written into the front panel image table 223 as indicated by process block 549. As indicated by process block 550, the new 16-bit switch state word is then written into a task transmission queue along with its row number (1 to 4). A three-byte message is thus formed for transmission through the serial data link to update the front panel image table 444 in the main processor (FIG. 2).

All four rows of the switch matrix are sequentially compared with the corresponding rows in the front panel image table 223. After each row is compared, the row pointers R1 and R2 are incremented as indicated by process block 551, the row counter is decremented as indicated by process block 552, and a test is made at decision block 553 to determine whether all four rows have been examined for changes. When all four rows have been examined, the front panel image table 233 in the front panel processor has been updated with any changes that have occurred in the front panel switches 15 during the previous 50 millisecond time period and these changes have been stored in a task transmission queue portion of the front panel processor RAM 226.

Referring particularly to FIG. 17B, the switch monitor routine 502 then operates to update the main processor by transmitting the changes through the cable 9. A "sleep" counter is first set to ten (10×5 msec.=50 msec.) as indicated by process block 554, and the task transmission queue is checked at decision block 555 to determine if any updating is necessary. If not, the system branches back to the scheduler through a set of instructions indicated by process block 556 which store the sleep counter contents in word five of the task status block 515.

If changes are to be transmitted, a "busy" flag associated with the communications routine is first checked to determine if a message transmisson is presently taking place, as indicated at decision block 557. If not, the device code for the switch monitor is loaded into the transmit request table and the communication routine 558 is called up and executed to initiate the transmission of the first three character text. Upon return from the communication routine, the system increments a transmission queue pointer as indicated by process block 559 to point to the next three bytes of data in the transmission queue and the new value is loaded into an IOPB memory location where it is used by the communication routine. If the end of the transmission queue has been reached as indicated at decision block 560, the pointer is reset as indicated by process block 561 to the top of the switch monitor transmission queue.

The switch monitor routine then puts itself to sleep for five milliseconds, during which time the communication routine transmits three bytes of data from the transmission queue. This is accomplished at process block 562 which includes instructions that load a "one" into line five of the task status block 515 and then decrements the sleep counter by one. The system then exits to the scheduler after lines six, seven and eight of the task status block 515 are loaded with data which direct the system to re-enter the switch monitor routine at decision block 563 when five milliseconds expires.

Upon re-entry, the sleep counter is examined to determine if it has been decremented to zero at decision block 563. If it has, the system branches back to the start of the routine to perform the next scan of the front panel switches 15. Normally, however, the system loops back to decision block 555 to determine if further updates need to be transmitted. This loop, indicated by arrow 564, may be repeated a number of times and is usually exited at decision block 555 back to the scheduler for the remainder of the fifty millisecond scan period.

Other tasks in the front panel processor operate in a similar manner to input data from a peripheral device, write the data into a task transmission queue, and then call up the communication routine to transmit that data to the main processor. It is in this manner, for example, that data is input to the main processor from both the keyboard 14 and a tape reader.

Figure 18:
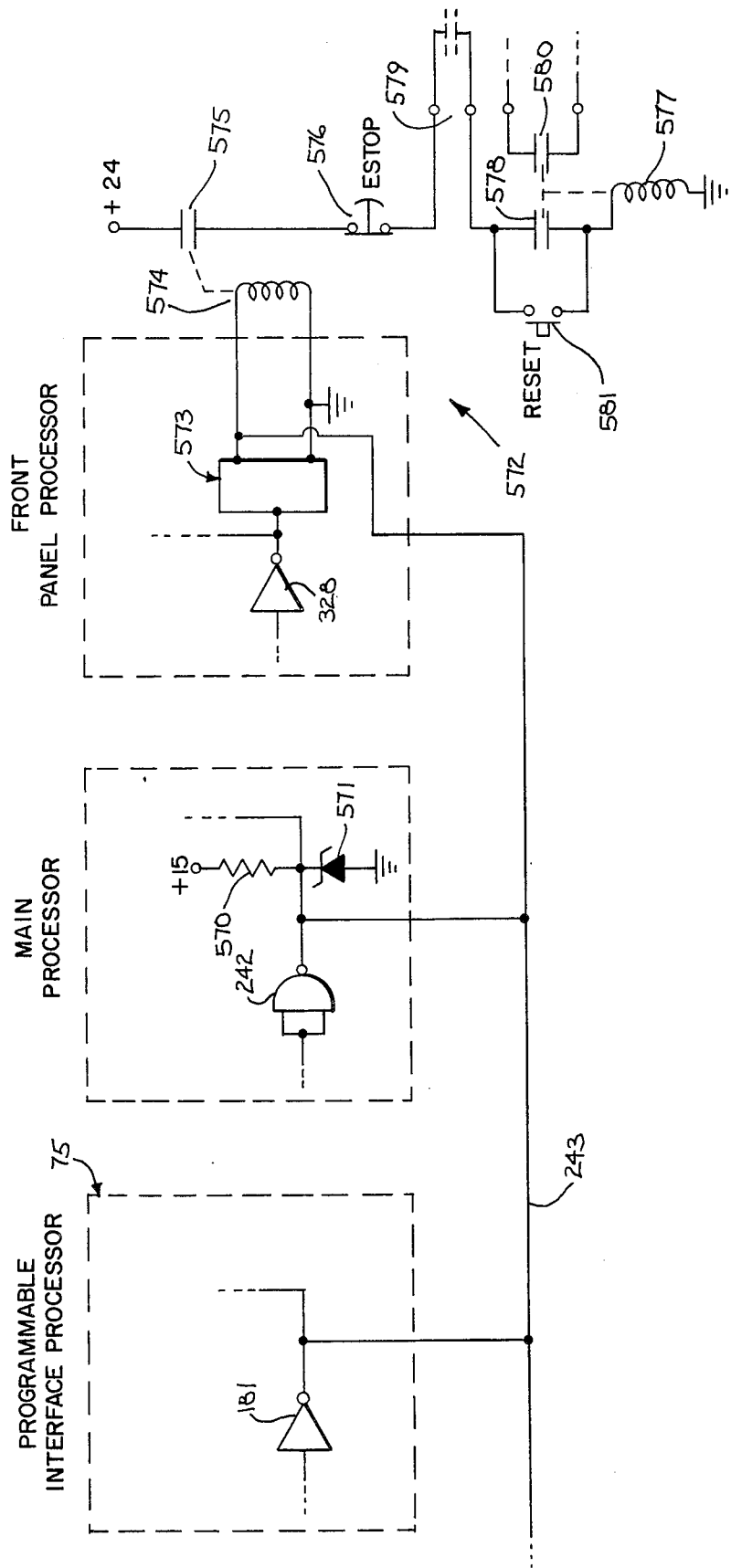
FIG. 18 is an electrical schematic diagram of the fault monitor line and its connections to the processors in the numerical control system of FIG. 1.

Referring particularly to FIG. 18, the output of the watchdog timer circuit in each of the processors are coupled together by the fault monitor line 243. A resistor 570 connects the fault monitor line 243 to a source of logic high voltage and a zener diode 561 insures that the voltage on the fault monitor line 243 does not exceed 5.1 volts. As described above, the fault monitor line 243 is driven to a logic low voltage by one of the gates 181, 242 or 328 whenever one of the watchdog timers "times out." This logic low voltage operates to generate an interrupt request to the microprocessors 25, 85 and 221. The gate 328 is coupled to the fault monitor line 243 through an optical coupler 573 because the front panel processor circuit ground is not the same as circuit ground on the main processor and the programmable interface processor.

When the fault monitor line 243 is driven low, an NMI interrupt is generated in the programmable interface circuit and this is processed as described above. In both the main processor and the front panel processor, however, the interrupt is vectored directly to watchdog timer interrupt service routines. These routines store a message in a designated location in their respective random access memories and then promptly go into an idle state in which all processing stops. The stored message can be retrieved by maintenance personnel to determine what caused the shutdown. That is, the message indicates that the watchdog timer timed out on one of the processors.

The fault monitor line 243 also conncts to an emergency stop circuit indicated generally in FIG. 18 at 572. More specifically, the fault monitor line 243 connects to the input of a relay coil 574. The relay coil 574 is magnetically coupled to a set of normally open contacts 575 which are in turn connected in series between a positive d.c supply terminal and a normally closed emergency stop pushbutton switch 576.

The "ESTOP" switch 576 is mounted on the pendent control station front panel and it is conncted in a series circuit comprised of a second relay coil 577, a normally open set of contacts 578 which are magnetically operated by the relay coil 577, and a pair of terminals 579 which are accessible to the user for connection to external switch contacts. The relay coil 577 also magnetically operates a second set of contacts 580 which are accessible to the user and which can be connected to indicating devices such as lights or horns. A reset pushbutton switch 581 is connected in parallel with the relay contacts 578 and is mounted on the pendent control station 2.

When a malfunction occurs and the fault monitor line 243 is driven low, the relay coil 574 is deenergized. This causes the contacts 575 to open circuit and the second relay coil 577 is thus deenergized. The relay contacts 578 are thus opened to latch the emergency stop circuit in its deenergized condition. The relay contacts 580 are thus latched open to operate an external indicating device. When the malfunction has been corrected, the emergency stop circuit 572 may be reset by depressing the reset pushbutton switch 581.

COMPONENT APPENDIX

| Reference Number | Manufacturer And Model No. | Description |
|---|---|---|
| 25 | Texas Instruments, Inc. TMS 9900 | 16-bit microprocessor. |
| 29 | MOSTEK MK4104 | 4K × 1 Random Access Memory. |
| 30 | Signetics 82S181 | 1K × 8 Programmable Read-Only Memory. |
| 37 | AMD 9551-4 | Universal Synchronous/Asynchronous Receiver/Transmitter. |
| 45 | Texas Instruments, Inc. TMS 9901 | Interrupt Controller. |
| 53, 54 | Texas Instruments, Inc. 74LS138 | 3-line-to-8-line decoder. |
| 84 | Texas Instruments, Inc. 74LS244 | Tristate Buffers. |
| 85 | Zilog Z-80 | 8-bit Microprocessor. |
| 86 | National Semiconductor DP8304 | Tristate Transceiver. |
| 88 | Signetics 8LS181 | 1K × 8 Programmable Read-Only Memory. |
| 89 | General Instrument ER3401 | 1K × 4 Electrically Alterable Read-Only Memory. |
| 94 | Intel 2114 | 1K × 4 Random Access Memory. |
| 97 | Texas Instruments, Inc. 74LS244 | Tristate Buffer. |
| 100 | Texas Instruments, Inc. 74S472 | 512 × 8 Programmable Read-Only Memory. |
| 103 | AMD 9551-4 | Universal Synchronous/Asynchronous Receiver/Transmitter. |
| 111,116 | Texas Instruments, Inc. 74LS374 | Octal Register. |
| 112,117, 122,123 | Texas Instruments, Inc. 74LS244 | Tristate Buffer. |
| 124 | Texas Instruments, Inc. 74LS374 | Octal Register. |

COMPONENT APPENDIX -continued

| Reference Number | Manufacturer And Model No. | Description |
|---|---|---|
| 130 | Texas Instruments, Inc. 74LS138 | 3-line-to-8-line Decoder. |
| 155 | Texas Instruments, Inc. 74LS138 | 3-line-to-8-line Decoder. |
| 159,162, 163 | Texas Instruments, Inc. 74LS139 | 2-line-to-4-line Decoder. |
| 170 | Texas Instruments, Inc. 74LS123 | Monostable Multivibrator. |
| 175 | Texas Instruments, Inc. 74LS244 | Tristate Buffer. |
| 194,195 | Texas Instruments, Inc. 74LS390 | Decade Counter. |
| 220 | Texas Instruments, Inc. TMS9902 | Universal Asynchronous Receiver/Transmitter. |
| 221 | Texas Instruments, Inc. TMS9900 | 16-bit Microprocessor. |
| 224 | Intel 2732 | 4K × 8 Programmable Read-Only Memory. |
| 225 | General Instrument ER3401 | 1K × 4 Electrically Alterable Read-Only Memory |
| 226 | Intel 2114 | 1K × 4 Random Access Memory. |
| 236 | Texas Instruments, Inc. 74LS374 | Octal Register. |
| 251 | National Semiconductor DP8304 | Octal Transceiver. |
| 252 | Standard Microsystems Corp. CRT5027 | CRT Timing and Controller. |
| 260 | Texas Instruments, Inc. 74LS139 | 2-line-to-4-line Decoder. |
| 269 | Texas Instruments, Inc. 74LS244 | Tristate Buffer. |
| 274,275, 276 | Texas Instruments, Inc. 74LS374 | Octal Register. |
| 277 | Texas Instruments, Inc. 74LS138 | 3-line-to-8-line Decoder. |
| 285 | Texas Instruments, Inc. TMS9901 | Interrupt Control. |
| 294 | Texas Instruments, Inc. TMS9902 | Universal Asynchronous Receiver/Transmitter. |
| 306 | Texas Instruments, Inc. 74LS244 | Tristate Buffer. |
| 325 | Texas Instruments, Inc. 74LS123 | Monostable Multivibrator. |
| 336 | Texas Instruments, Inc. 74LS138 | 3-line-to-8-line Decoder. |
| 338-341 | Texas Instruments, Inc. 74LS259 | 8-bit Addressable Latch. |
| 351-354 | Texas Instruments, Inc. 74LS138 | 3-line-to-8-line Decoder. |
| 573 | Monsanto MCT 210 | Optical coupler. |

We claim:

1. In a numerical control system having a plurality of separately operating programmed processors which operate together to control a machine tool, the improvement therein comprising:

a set of watchdog timer circuits, one associated with each of said processors and each watchdog timer circuit having an input terminal which periodically receives a signal from its associated processor that resets the watchdog timer and each having an output terminal at which a fault indicating logic signal is generated when the watchdog timer is not reset by its associated processor within a preset time interval;

a fault monitor line coupled to the output terminal of each of said watchdog timer circuits; and an emergency stop circuit coupled to said fault monitor line and being operable to indicate a malfunction condition when any one of said watchdog timer circuits generates a fault indicating logic signal.

2. The improved numerical control system as recited in claim 1 in which said fault monitor line is coupled to each of said processors through means for interrupting the normal operation of said processors when a fault indicating logic signal is generated on the fault monitor line.

3. The improved numerical control system as recited in claim 2 in which each programmed processor includes a memory which stores a watchdog timer interrupt service routine when it is interrupted by the fault indicating logic signal on said fault monitor line.

4. The improved numerical control system as recited in claim 1, 2 or 3 in which said emergency stop circuit includes a relay having a coil which is energized when the fault indicating logic signal is not present on said fault monitor line and which is deenergized when the fault indicating logic signal is present.

5. In a numerical control system having a plurality of separately operating programmed processors which operate together to control a machine tool, the improvement therein comprising:

a set of fault detecting circuits, one associated with each of said processors and each fault detecting circuit being operable to generate a fault indicating logic signal at its output when a malfunction in its associated processor is detected;

means connecting the output of each fault detecting circuit to an interrupt request terminal on its associated processor; and a fault monitor line coupled to the output terminal of each fault detecting circuit to apply a fault indicating logic signal generated by any one of said fault detecting circuits to the output terminals of all said fault detecting circuits, wherein the generation of a fault indicating logic signal by any one of said fault detecting circuits causes an interrupt request signal to be applied to the interrupt request terminal on each processor in the numerical control system.

6. The improved numerical control system as recited in claim 5 in which each processor is responsive to an interrupt request signal applied to its interrupt request terminal to terminate performance of its current function and perform a preselected function.

7. The improved numerical control system as recited in claim 5 or 6 in which an emergency stop circuit is coupled to said fault monitor line and is operable to indicate a malfunction condition when any one of said fault detecting circuits generates a fault indicating logic signal.

* * * * *